United States Patent
Oike

(10) Patent No.: US 9,509,927 B2
(45) Date of Patent: *Nov. 29, 2016

(54) SOLID-STATE IMAGING DEVICE, METHOD OF DRIVING THE SAME, SIGNAL PROCESSING METHOD FOR THE SAME, AND IMAGING APPARATUS

(71) Applicant: Sony Corporation, Tokyo (JP)

(72) Inventor: Yusuke Oike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,666

(22) Filed: Aug. 27, 2015

(65) Prior Publication Data
US 2015/0365615 A1    Dec. 17, 2015

Related U.S. Application Data

(63) Continuation of application No. 12/099,918, filed on Apr. 9, 2008, now Pat. No. 9,185,313.

(30) Foreign Application Priority Data

Apr. 12, 2007 (JP) ................. 2007-104425

(51) Int. Cl.
| | | |
|---|---|---|
| H04N 5/355 | (2011.01) | |
| H04N 5/369 | (2011.01) | |
| H04N 5/376 | (2011.01) | |
| H04N 5/378 | (2011.01) | |
| H04N 5/345 | (2011.01) | |
| H04N 5/359 | (2011.01) | |
| H04N 5/374 | (2011.01) | |
| H04N 5/335 | (2011.01) | |

(52) U.S. Cl.
CPC ............ *H04N 5/3559* (2013.01); *H04N 5/345* (2013.01); *H04N 5/3591* (2013.01); *H04N 5/369* (2013.01); *H04N 5/3698* (2013.01); *H04N 5/378* (2013.01); *H04N 5/3741* (2013.01); *H04N 5/3765* (2013.01); *H04N 5/335* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0224843 A1* | 10/2005 | Boemler | ........... | H01L 27/14603 257/233 |
| 2006/0208161 A1* | 9/2006 | Okita et al. | ....... | H01L 27/14603 250/208.1 |
| 2007/0045681 A1* | 3/2007 | Mauritzson | ....... | H01L 27/14609 257/292 |
| 2007/0152292 A1* | 7/2007 | Toros | ................ | H01L 27/14603 257/463 |

* cited by examiner

*Primary Examiner* — Twyler Haskins
*Assistant Examiner* — Akshay Trehan
(74) *Attorney, Agent, or Firm* — Sheridan Ross P.C.

(57) ABSTRACT

Disclosed herein is a solid-state imaging device, including, a pixel array unit, first driving means, second driving means, and third driving means.

12 Claims, 24 Drawing Sheets

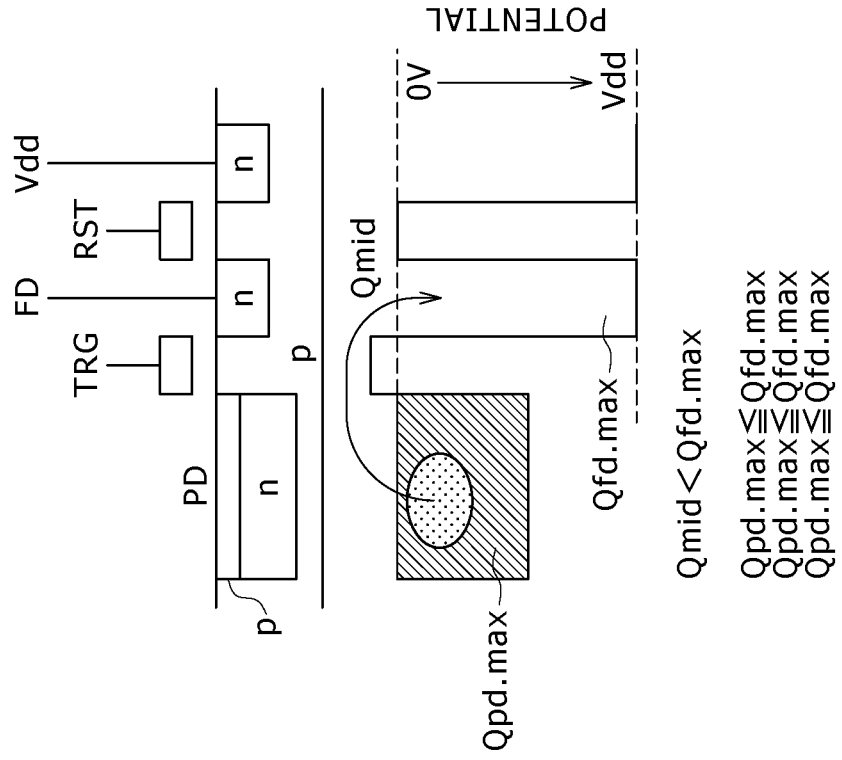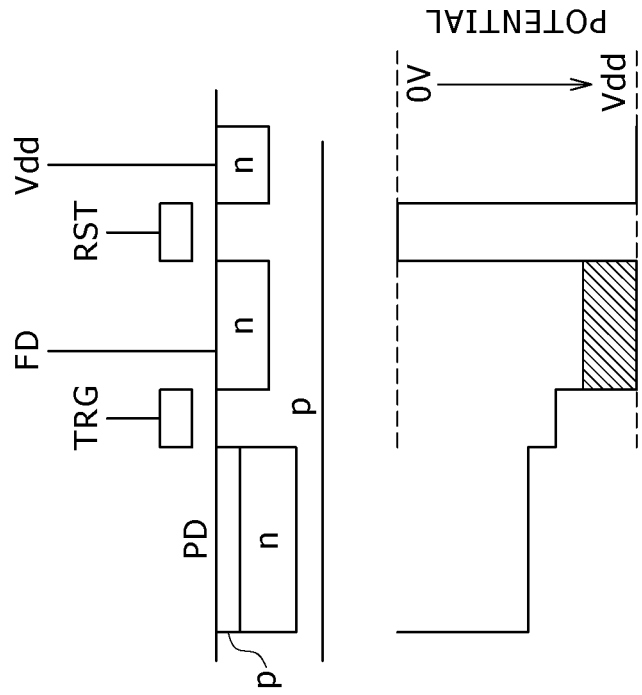

SOLID-STATE IMAGING DEVICE, METHOD OF DRIVING THE SAME, SIGNAL PROCESSING METHOD FOR THE SAME, AND IMAGING APPARATUS

CROSS-REFERENCE TO RELATED APPLICATIONS

This application is a continuation of U.S. patent application Ser. No. 12/099,918, filed Apr. 9, 2008, which claims priority to Japanese Patent Application No. JP 2007-104425, filed in the Japan Patent Office on Apr. 12, 2007, the entire disclosures of which are hereby incorporated herein by reference.

FIELD OF THE INVENTION

The present invention relates to a solid-state imaging device, a method of driving the same, a signal processing method for the same, and an imaging apparatus.

DESCRIPTION OF THE RELATED ART

FIG. 27 shows an example of a configuration of a unit pixel 100 of a solid-state imaging device. As with this example, in the unit pixel 100 having a transfer transistor for transferring signal charges obtained through photoelectric conversion in a photoelectric conversion element 101, a maximum quantity, Qfd.max, of charges accumulated which can be transferred to a floating diffusion capacitor (FD) 106 of the unit pixel is made sufficiently larger than a maximum quantity, Qpd.max, of charges accumulated in the photoelectric conversion element 101 as a light receiving unit. As a result, the perfect transfer of the signal charges from the photoelectric conversion element 101 to the floating diffusion capacitor 106 is realized by removing the residual charges in the photoelectric conversion element 101.

The perfect transfer is realized for the signal charges obtained through the photoelectric conversion in the photoelectric conversion element 101 in the manner as described above, which results in that a residual image in a phase of photographing of an image can be prevented and a satisfactory linearity between a luminance of an incident light and a sensor output signal can be realized. In this connection, the unit pixel 100 of this embodiment includes a reset transistor 103, an amplification transistor 104 and a pixel selecting transistor 105 in addition to the transfer transistor 102.

However, the unit pixel 100 shown in FIG. 27 involves the following problems.

(1) Since the maximum quantity, Qfd.max, of charges accumulated must be larger than the maximum quantity, Qpd.max, of charges accumulated in the photoelectric conversion element 101, there is a limit to reduction of the capacitance of the floating diffusion capacitor 106 for enhancement of a charge-to-voltage conversion efficiency.

(2) Since for the same reason as that of the above, a decrease in power source voltage Vdd used as a reset voltage for the floating diffusion capacitor 106 leads to reduction of the maximum quantity, Qfd.max, of charges accumulated in the floating diffusion capacitor 106, there is a limit to lowering of the power source voltage Vdd.

Then, heretofore, the problems (1) and (2) described above are solved in the following manner. That is to say, when the maximum quantity, Qfd.max, of charges accumulated is less due to the reduction of the capacitance of the floating diffusion capacitor 106 for enhancement of a charge-to-voltage conversion efficiency, or when the maximum quantity, Qfd.max, of charges accumulated is less owing to the lowering of the reset voltage (power source voltage) Vdd, after the charge transfer, the signal reading, and the reset of the floating diffusion capacitor 106 are carried out, the charges which remain in the photoelectric conversion element 101 because they are more than the transfer transistor 102 can transfer are transferred again to read out the signal. As a result, all the charges accumulated in the photoelectric conversion element 101 are read out in plural batches. This technique, for example, is described in the Japanese Patent Laid-Open No. 2001-177775.

SUMMARY OF THE INVENTION

In the related art described above, the maximum quantity, Qfd.max, of charges accumulated in the floating diffusion capacitor 106 is less than the maximum quantity, Qpd.max, of charges accumulated in the photoelectric conversion element 101. Also, as shown in FIG. 28, all the charges able to be transferred to the floating diffusion capacitor 106 are transferred. Thus, the maximum quantity, Qpd.max, of charges accumulated in the photoelectric conversion element 101 can not partitioned in units of the maximum quantity, Qfd.max, of charges accumulated in the floating diffusion capacitor 106 (A). For this reason, the maximum quantity, Qpd.max, of charges accumulated in the photoelectric conversion element 101 can not be transferred in plural batches with an arbitrary quantity of charges as a unit (B).

In addition, as shown in FIG. 29, in the solid-state imaging device adopting a configuration that a floating diffusion capacitor FD and a reading-out circuit 200 are shared among a plurality of pixels, a capacitance of the floating diffusion capacitor FD can not be reduced in some cases. In such cases, since the signal charges can not be transferred in plural batches, processing for adding the signals transferred in plural batches with the weighting factors, respectively, can not be applied to the solid-state imaging device. As a result, the effect due to these processing for, for example, changing the sensitivity in correspondence to the range of the quantity of light can not be obtained.

In the light of the foregoing, it is therefore desirable to provide a solid-state imaging device which is capable of transferring signal charges obtained through photoelectric conversion in a photoelectric conversion unit in plural batches with an arbitrary quantity of charges as a unit when the signal charges are transferred, a method of driving the same, a signal processing method for the same, and an imaging apparatus.

In order to attain the desire described above, according to an embodiment of the present invention, there is provided a solid-state imaging device, including:

a pixel array unit constituted by arranging unit pixels in matrix, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element;

first driving means configured to, with a part of the signal charges accumulated in the photoelectric conversion unit for an accumulation period of time of one unit being held in the photoelectric conversion unit, drive the transfer element by using a first control voltage in accordance with which the accumulated charges having a quantity exceeding a quantity of signal charges held are transferred by the transfer element;

second driving means configured to drive the transfer element by using a second control voltage in accordance with which all the signal charges held in the photoelectric conversion unit are transferred by the transfer element; and third driving means configured to drive the output section in order to read out the signal charges transferred by successively performing the drive by the first driving means and the drive by the second driving means.

According to another embodiment of the present invention, there is provided a method of driving a solid-state imaging device constituted by arranging unit pixels, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element, the method including the steps of:

driving, with a part of the signal charges accumulated in the photoelectric conversion unit for an accumulation period of time of one unit being held in the photoelectric conversion unit, the transfer element by using a first control voltage in accordance with which the accumulated charges having a quantity exceeding a quantity of signal charges held are transferred by the transfer element;

driving the transfer element by using a second control voltage in accordance with which all the signal charges held in the photoelectric conversion unit are transferred by the transfer element; and reading out the signal charges transferred by successively performing the drive using the first control voltage and the drive using the second control voltage.

According to still another embodiment of the present invention, there is provided a signal processing method for a solid-state imaging device including:

a pixel array unit constituted by arranging unit pixels in matrix, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element;

first driving means configured to, with a part of the signal charges accumulated in the photoelectric conversion unit for an accumulation period of time of one unit being held in the photoelectric conversion unit, drive the transfer element by using a first control voltage in accordance with which the accumulated charges having a quantity exceeding a quantity of signal charges held are transferred by the transfer element;

second driving means configured to drive the transfer element by using a second control voltage in accordance with which all the signal charges held in the photoelectric conversion unit are transferred by the transfer element; and third driving means for driving the output section in order to read out the signal charges transferred by successively performing the drive by the first driving means and the drive by the second driving means, the signal processing method including the step of:

adding a plurality of output signals successively read out from the output means through the drive by the third driving means under the drive for the transfer element by the first and second driving means.

According to yet another embodiment of the present invention, there is provided an imaging apparatus, including:

a solid-state imaging device constituted by arranging unit pixels, each of the unit pixels including a photoelectric conversion unit configured to convert an optical signal into signal charges, a transfer element configured to transfer the signal charges obtained through photoelectric conversion in the photoelectric conversion unit, and output means configured to output the signal charges transferred by the transfer element; and an optical system for focusing an incident light onto an imaging area of the solid-state imaging device;

wherein the solid-state imaging device includes:

first driving means configured to, with a part of the signal charges accumulated in the photoelectric conversion unit for an accumulation period of time of one unit being held in the photoelectric conversion unit, drive the transfer element by using a first control voltage in accordance with which the accumulated charges having a quantity exceeding a quantity of signal charges held are transferred by the transfer element;

second driving means configured to drive the transfer element by using a second control voltage in accordance with which all the signal charges held in the photoelectric conversion unit are transferred by the transfer element;

third driving means configured to drive the output means in order to read out the signal charges transferred by successively performing the drive by the first driving means and the drive by the second driving means; and signal processing means configured to add a plurality of output signals successively read out from the output means through the drive by the third driving means under the drive for the transfer element by the first and second driving means.

According to the embodiments of the present invention, the operation for, with a part of the signal charges accumulated in the photoelectric conversion unit for the accumulation period of time of one unit being held in the photoelectric conversion unit, driving the transfer element by using the first control voltage in accordance with which the accumulated charges having the quantity exceeding the quantity of signal charges held are transferred, and the operation for driving the transfer element by using the second control voltage in accordance with which all the signal charges held in the photoelectric conversion unit are transferred are successively carried out. Also, the voltage value of the first control voltage is suitably set. As a result, the signal charges obtained through the photoelectric conversion in the photoelectric conversion unit can be transferred in plural batches with an arbitrary quantity of charges as a unit.

BRIEF DESCRIPTION OF THE DRAWINGS

FIGS. 28A and 28B are respectively diagrams explaining a problem in the related art (part 1)

DETAILED DESCRIPTION OF THE PREFERRED EMBODIMENTS

Preferred embodiments of the present invention will be described in detail hereinafter with reference to the accompanying drawings.

Figure 1:
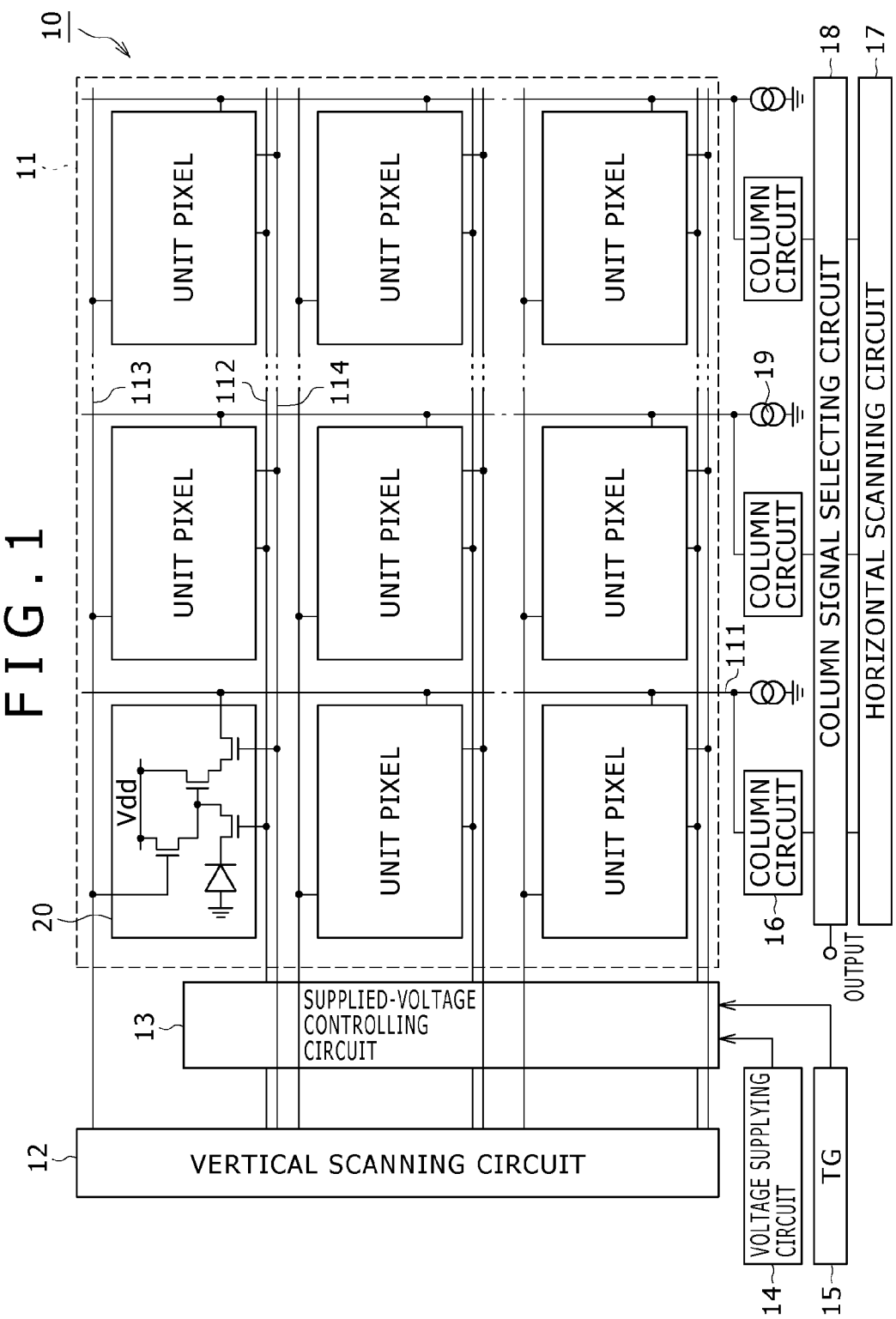
FIG. 1 is a system configuration diagram showing a CMOS image sensor according to an embodiment of the present invention.

FIG. 1 is a system configuration diagram showing a configuration of a solid-state imaging device, for example, a CMOS image sensor according to a first embodiment of the present invention.

As shown in FIG. 1, a CMOS image sensor 10 of this embodiment includes a pixel array unit 11, and its peripheral circuit. In this case, the pixel array unit 11 is configured such that units pixels each including a photoelectric conversion element (hereinafter simply referred to as "a pixel" in some cases) 20 are two-dimensionally arranged in matrix.

A vertical scanning circuit 12, a supplied-voltage controlling circuit 13, a voltage supplying circuit 14, a timing generating circuit (TG) 15, a plurality of column circuits 16, a horizontal scanning circuit 17, a column signal selecting circuit 18, and the like, for example, are provided as the peripheral circuit of the pixel array unit 11.

For the matrix arrangement of the pixels 20 in the pixel array unit 11, a vertical signal line 111 is wired every pixel column, and driving control lines, for example, a transfer control line 112, a reset control line 113, and a selection control line 114 are wired every pixel row.

Constant current sources 19 are connected to one ends of the vertical signal lines 111, respectively. A transistor for current bias a gate of which, for example, is biased by a bias voltage Vbias may be used instead of using the constant current source 16. In this case, the transistor for current bias configures, together with an amplification transistor 24 which will be described later, a source follower circuit (refer to FIG. 2).

The vertical scanning circuit 12 is constituted by a shift register, an address decoder or the like. In addition, while vertically scanning the pixels 20 of the pixel array unit 11 in units of rows with respect to each of the electronic shutter rows and the read-out rows, the vertical scanning circuit 12 carries out an electronic shutter operation for sweeping off the signals from corresponding ones of the pixels 20 belonging to the electronic shutter row, and carries out a reading-out operation for reading out the signals from corresponding ones of the pixels belonging to the read-out row.

Although an illustration is omitted here, the vertical scanning circuit 12 includes a reading-out scanning system, and an electronic shutter scanning system. In this case, the reading-out scanning system carries out the reading-out operation for reading out the signals from the pixels 20 belonging to the read-out row while successively selecting the pixels 20 in units of the rows. Also, the electronic shutter scanning system carries out the electronic shutter operation for the same row (electronic shutter row) before the reading-out scanning by the reading-out scanning system by a period of time corresponding to a shutter speed.

Also, a period of time ranging from a first timing to a second timing becomes an accumulation period of time (exposure period of time) of one unit for the signal charges in each of the pixels 20. Here, at the first timing, the unnecessary charges in the photoelectric conversion unit are reset through the shutter scanning by the electronic shutter scanning system. Also, at the second timing, the signals are read out from the pixels, respectively, through the reading-out scanning by the reading-out scanning system. That is to say, the electronic shutter operation means an operation for resetting (sweeping off) the signal charges accumulated in the photoelectric conversion unit, and starting to newly accumulate the signal charges after completion of the reset of the signal charges.

The supplied-voltage controlling circuit 13 controls a voltage value (peak value) of a transfer pulse TRG supplied (applied) to the gate electrode (control electrode) of the transfer transistor (transfer element) 22 within the unit pixel 20. A concrete configuration of this supplied-voltage controlling circuit 13 will be described later.

The voltage supplying circuit 14 supplies a plurality of control voltages having different voltage values to the supplied-voltage controlling circuit 13. The plurality of control voltages are successively supplied as the transfer pulses TRG having the different voltage values to the gate electrode of the transfer transistor 22. The details of the transfer pulse TRG having the different voltage values will be described later.

The timing generating circuit (TG) 15 generates a timing signal PTRG in accordance with which a timing is determined when the supplied-voltage controlling circuit 13 successively supplies the transfer pulses TRG having the different voltage values to the gate electrode of the transfer transistor 22.

The column circuits 16, for example, are disposed so as to correspond to the pixel columns of the pixel array unit 11, respectively, that is, in one-to-one correspondence to the pixel columns. The column circuits 16 execute predetermined signal processing for the signals which are successively outputted from the pixels 20 belonging to the read-out row selected through the vertical scanning operation by the vertical scanning circuit 12 through the respective vertical signal lines 111, and temporarily hold therein the pixel signals after completion of the predetermined signal processing.

A circuit configuration having a sample and hold circuit for sampling and holding a pixel signal outputted through the vertical signal line 111, a circuit configuration having a noise removing circuit, including a sample and hold circuit, for removing a reset noise or a fixed pattern noise inherent in a pixel owing to a dispersion in threshold of an amplification transistor 24 by executing correlated double sampling (CDS) processing, or the like is used for the column circuit 16.

However, the circuit configuration described above is merely an example, and thus the embodiment of the present invention is by no means limited thereto. For example, it is also possible to adopt a circuit configuration that the column circuit 16 is given an analog-to-digital (A/D) conversion function so that a pixel signal having a predetermined signal level is outputted in the form of a digital signal.

The horizontal scanning circuit 17 includes a shift register, an address decoder or the like. The horizontal scanning circuit 17 horizontally scans the column circuits 16 in order disposed so as to correspond to the pixel columns of the pixel array unit 11, respectively. The column signal selecting circuit 18 is composed of a horizontal selection switch, a horizontal signal line, and the like. The column signal selecting circuit 18 successively outputs the pixel signals which are temporarily held in the column circuits 16, respectively, synchronously with the horizontal scanning operation by the horizontal scanning circuit 17.

It is noted that a timing signal and a control signal each of which becomes a reference for operations of the vertical scanning circuit 12, the column circuits 16, the horizontal scanning circuit 17, and the like are generated from a timing controlling circuit (not shown).

(Pixel Circuit)

Figure 2:
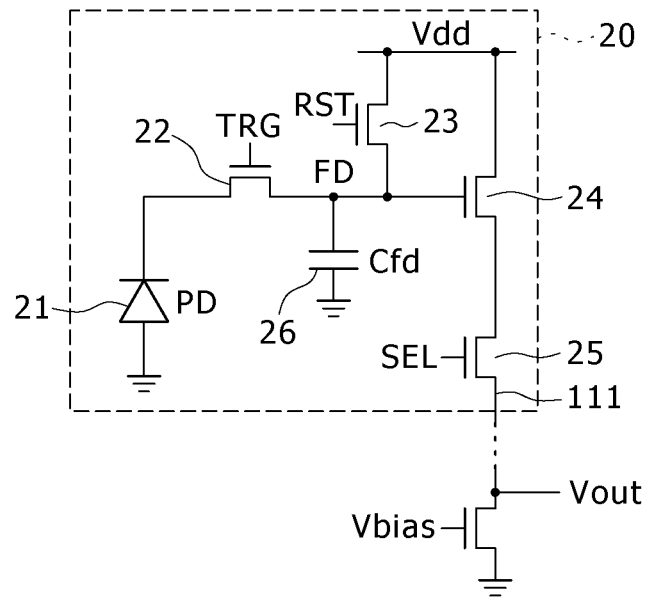
FIG. 2 is a circuit diagram showing an example of a circuit configuration of a unit pixel shown in FIG. 1.

FIG. 2 is a circuit diagram showing an example of a circuit configuration of the unit pixel 20. The unit pixel 20 of this example is configured as a pixel circuit including four transistors, for example, a transfer transistor (transfer element) 22, a reset transistor 23, an amplification transistor 24, and a selection transistor 25 in addition to a photoelectric conversion element (photoelectric conversion unit) 21 such as a buried photodiode. In this case, although N-channel MOS transistors, for example, are used as the four transistors 22 to 25, the present invention is by no means limited to this configuration.

The transfer transistor 22 is connected between a cathode electrode of the photoelectric conversion element 21 and the floating diffusion capacitor (FD) 26. The transfer transistor 22 transfers signal charges (electrons in this case) which have been accumulated through the photoelectric conversion in the photoelectric conversion element 21 to the floating diffusion capacitor 26 by supplying a transfer pulse TRG to its gate electrode (control electrode). Thus, the floating diffusion capacitor 26 serves as a charge-to-voltage conversion unit for converting the signal charges into a voltage signal.

A drain electrode of the reset transistor 23 is connected to a reset line 115, and a source electrode thereof is connected to one end of the floating diffusion capacitor 26 opposite to a grounding end thereof. Prior to the transfer of the signal charges from the photoelectric conversion element 21 to the floating diffusion capacitor 26, the reset transistor 23 resets a potential of the floating diffusion capacitor 26 to a reset voltage Vrst in accordance with a reset pulse RST supplied to its gate electrode.

A gate electrode of the amplification transistor 24 is connected to the one end of the floating diffusion capacitor 26, and a drain electrode thereof is connected to the pixel power source for supplying the power source voltage Vdd. The amplification transistor 24 outputs the potential of the floating diffusion capacitor 26, after being reset by the reset transistor 23, in the form of a signal having a reset level, and outputs a potential of the floating diffusion capacitor 26, after the signal charges are transferred to the floating diffusion capacitor 26 by the transfer transistor 22, in the form of a signal having a signal level.

For example, a drain electrode of the selection transistor 25 is connected to a source electrode of the amplification transistor 24, and a source electrode thereof is connected to the vertical signal line 111. The selection transistor 25 is turned ON in accordance with a selection pulse SEL applied to its gate electrode to set the pixel 20 in a selection state, thereby outputting a signal outputted from the amplification transistor 24 to the vertical signal line 111. The selection transistor 25 can also adopt a configuration of being connected between the pixel power source (Vdd) and the drain electrode of the amplification transistor 24.

Note that, although the case where the embodiment of the present invention is applied to the CMOS image sensor including the unit pixel 20 having the four-transistor configuration including the transfer transistor 22, the reset transistor 23, the amplification transistor 24, and the selection transistor 25 has been given here as an example, the present invention is by no means limited to this application example.

Figure 3:
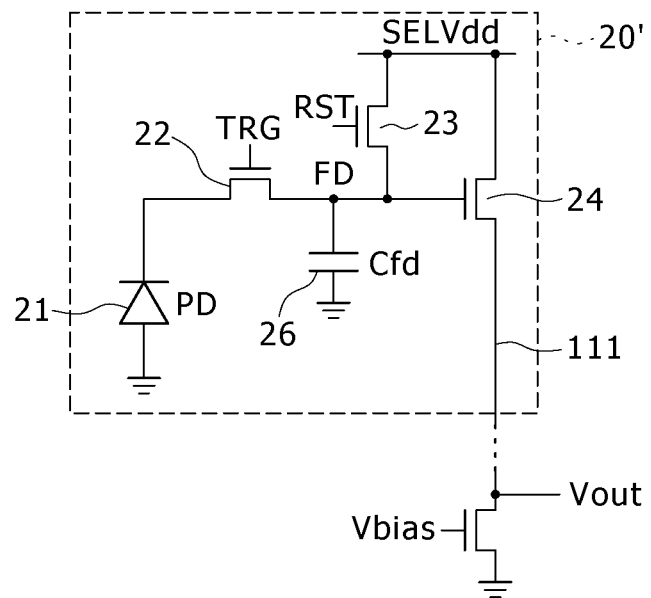
FIG. 3 is a circuit diagram showing another example of the circuit configuration of the unit pixel shown in FIG. 1.
Figure 29:
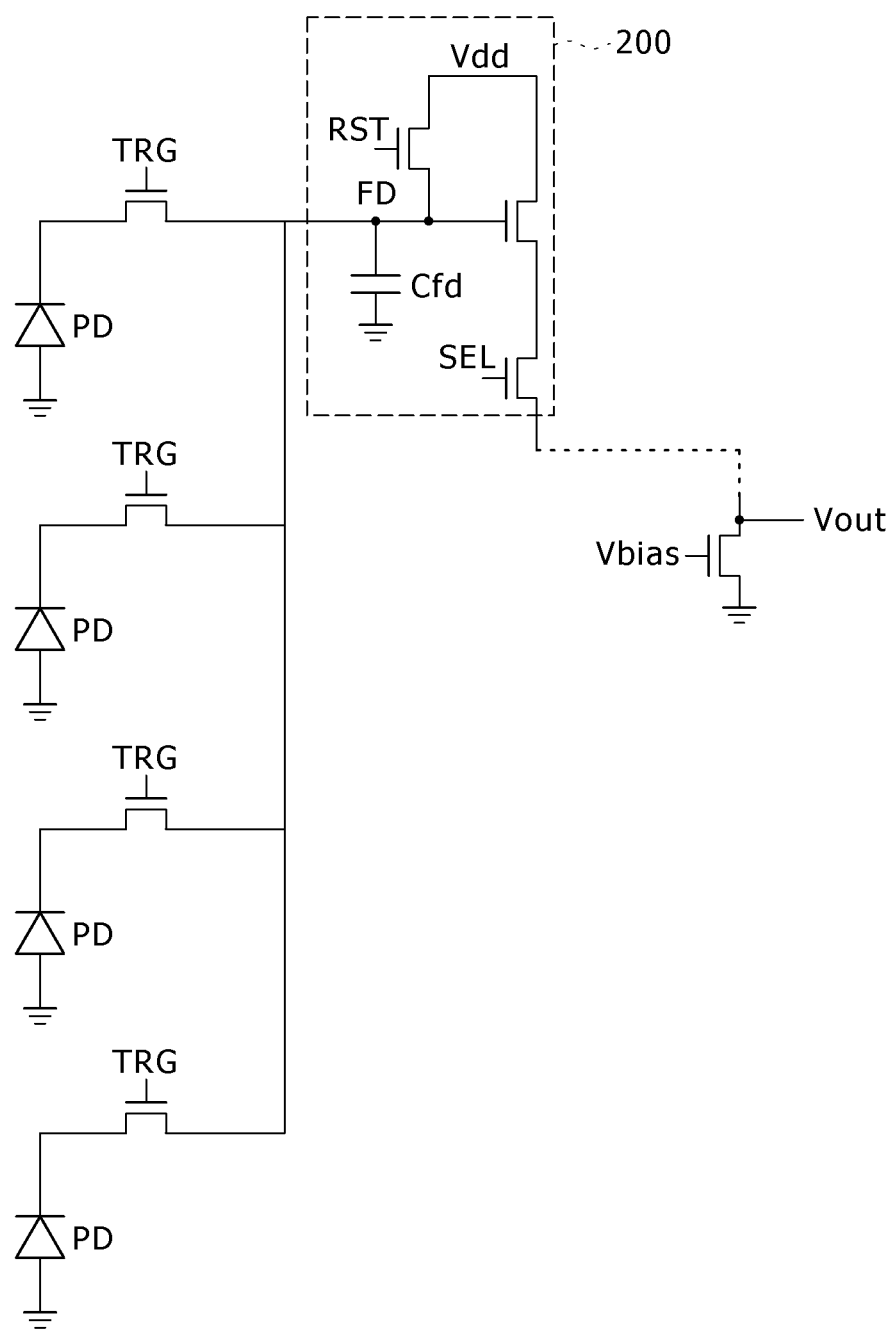
FIG. 29 is a diagram explaining a problem in the related art (part 1).

Specifically, the present invention can also be applied to a CMOS image sensor including a unit pixel 20' having a three-transistor configuration in which as shown in FIG. 3, the selection transistor 25 shown in FIG. 2 is omitted, and a power source voltage SELVdd is made variable, thereby giving the amplification transistor 24 the function of the selection transistor 25, a CMOS image sensor having a configuration in which as shown in FIG. 29, a floating diffusion capacitor FD and a reading-out circuit 200 are shared among a plurality of pixels, or the like.

[Supplied-Voltage Controlling Circuit]

The supplied-voltage controlling circuit 13 receives as its input an address signal ADR in accordance with which the unit pixels 20 belonging to the pixel row selected through the vertical scanning operation by the vertical scanning circuit 12 are driven to select one of a plurality of voltages supplied from the voltage supplying circuit 14, thereby supplying the voltage thus selected as the transfer pulse TRG to the gate electrode of the transfer transistor 22 within the unit pixel 20.

An ON voltage Von by which the transfer transistor 22 is turned ON, an OFF voltage Voff by which the transfer transistor 22 is turned OFF, and an intermediate voltage Vmid between the ON voltage and the OFF voltage are supplied as a plurality of voltages from the voltage supplying circuit 14. Here, the intermediate voltage Vmid means a voltage by which while a part of the accumulated charges in the photoelectric conversion element 21 is held, the remaining accumulated charges can partially transferred to the floating diffusion capacitor 26.

In the pixel circuit described above, since the transfer transistor 22 is of the N-channel, the ON voltage is set as the power source voltage Vdd, and the OFF voltage Voff is set as a grounding voltage, preferably, set as a voltage lower than the grounding voltage. In addition, in this embodiment, two intermediate voltages having different voltage values, specifically, two intermediate voltages Vmid0 and Vmid1 each of which is larger than the OFF voltage Voff and is smaller than the ON voltage Von are used as the intermediate voltage Vmid. In this connection, in the case where the transfer transistor 22 is of the P-channel, the grounding voltage and the power source voltage Vdd become the ON voltage Von and the OFF voltage Voff, respectively. Therefore, the intermediate voltage Vmid becomes the two intermediate voltages Vmid0 and Vmid1 each of which is larger than the ON voltage Von and is smaller than the OFF voltage Voff.

As a result, the four voltages, that is, the ON voltage Von, the intermediate voltages Vmid0 and Vmid1, and the OFF voltage Voff are supplied from the voltage supplying circuit 14 to the supplied-voltage controlling circuit 13. The voltage values of the four voltages show a relationship of Voff<Vmid0<Vmid1<Von. Also, each of the intermediate voltages Vmid0 and Vmid1, and the ON voltage Von of the four voltages is used as the transfer pulse TRG.

In order to control timings at which the intermediate voltages Vmid0 and Vmid1, and the ON voltage Von are supplied from the voltage supplying circuit 13, respectively, three timing signals PTRG1, PTRG2 and PTRG3 are supplied from the timing generating circuit 15 to the supplied-voltage controlling circuit 13. The supplied-voltage controlling circuit 13 selects one of the intermediate voltages Vmid0 and Vmid1, and the ON voltage Von based on the timing signals PTRG1, PTRG2 and PTRG3, and supplies the selected one as the intermediate voltage Vmid to the gate electrode of the transfer transistor 22.

Figure 4:
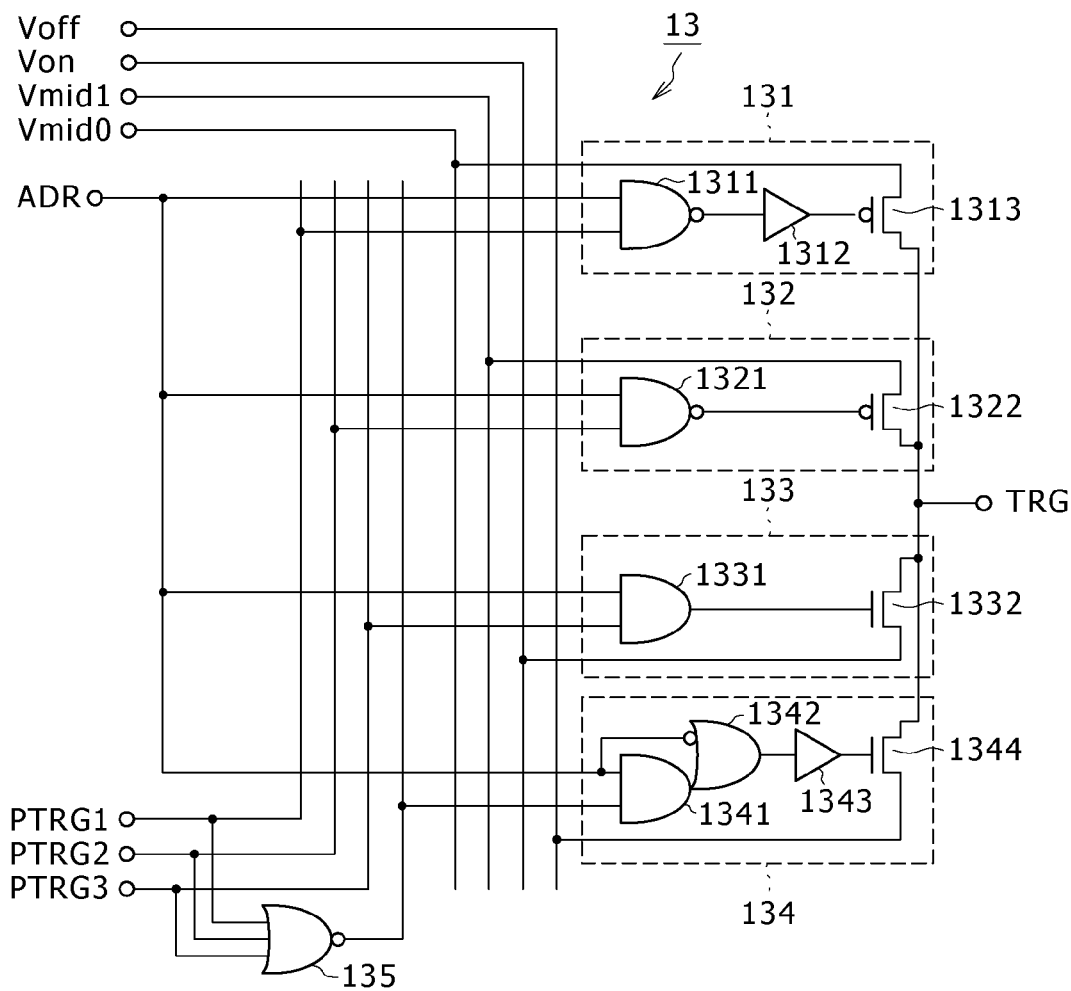
FIG. 4 is a circuit diagram showing an example of a circuit configuration of a supplied-voltage controlling circuit shown in FIG. 1.

FIG. 4 is a circuit diagram showing an example of a circuit configuration of the supplied-voltage controlling circuit 13. As shown in FIG. 4, the supplied-voltage controlling circuit 13 includes four circuit blocks 131 to 134 corresponding to the four voltages, that is, the intermediate voltages Vmid0 and Vmid1, the ON voltage Von, and the OFF voltage Voff, respectively, and 3-input NOR circuit 135.

An address signal ADR is commonly supplied from the vertical scanning circuit 12 to each of the circuit blocks 131 to 134. The timing signals PTRG1, PTRG2 and PTRG3 are supplied as three inputs from the timing generating circuit 15 to the NOR circuit 135.

The circuit block 131 includes a NAND circuit 1311 for receiving its two inputs the address signal ADR and the timing signal PTRG1, a level shifter 1312, and a P-channel driving transistor 1313. The circuit block 131 selects the intermediate voltage Vmid0 and supplies the intermediate voltage Vmid0 thus selected to the gate electrode of the transfer transistor 22.

The circuit block 132 includes an NAND circuit 1321 for receiving as its two inputs the address signal ADR and the timing signal PTRG2, and a P-channel driving transistor 1322. The circuit block 132 selects the intermediate voltage Vmid1, and supplies the intermediate voltage Vmid1 thus selected to the gate electrode of the transfer transistor 22.

The circuit block 133 includes an AND circuit 1331 for receiving its two inputs the address signal ADR and a timing signal PTRG3, and an N-channel driving transistor 1332. The circuit block 133 selects the ON voltage Von and supplies the ON voltage Von thus selected to the gate electrode of the transfer transistor 22.

The circuit block 134 includes an AND circuit 1341 for receiving as its two inputs the address signal ADR and an output signal from the NOR circuit 135, an OR circuit 1342 for receiving the address signal ADR at one input terminal having a negative logic set thereat, and receiving an output signal from the AND circuit 1341 at the other input terminal, a level shifter 1343, and an N-channel driving transistor 1344. The circuit block 134 selects the OFF voltage Voff, and supplies the OFF voltage Voff thus selected to the gate electrode of the transfer transistor 22.

In order to supply a voltage lower than the grounding voltage, for example, −1.0 V as the OFF voltage Voff in accordance with which the transfer transistor 22 is turned OFF, the circuit block 134 adopts a circuit configuration for operating exclusively from other circuit blocks 131, 132 and 133 based on the operation of the NOR circuit 135.

Figure 5:
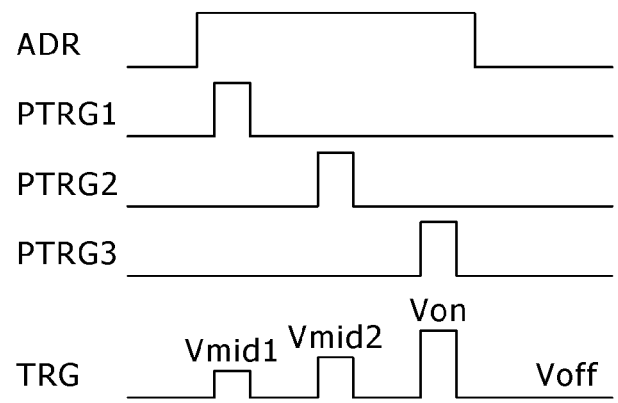
FIG. 5 is a timing chart showing a timing relationship between an input operation and an output operation in the supplied-voltage controlling circuit.

FIG. 5 shows a timing relationship between inputs and outputs to and from the supplied-voltage controlling circuit 13. In the case where it is assumed that the voltages to be supplied to the gate electrode of the transfer transistor 22 are the intermediate voltages Vmid0 and Vmid1, the ON voltage Von and the OFF voltage Voff, when the pixel row is selected by the address signal ADR, in accordance with the timing signals PTRG1, PTRG2 and PTRG3, the intermediate voltages Vmid0 and Vmid1, and the ON voltage Von corresponding thereto, respectively, are successively supplied to the gate electrode of the transfer transistor 22, and the OFF voltage Voff is supplied in the case other than the above case.

In the manner as described above, the intermediate voltages Vmid0 and Vmid1, and the ON voltage Von are successively supplied in this order from the supplied-voltage controlling circuit 13 to the gate electrode of the transfer transistor 22 every pixel row synchronously with the vertical scanning operation by the vertical scanning circuit 12 under the control made by the supplied-voltage controlling circuit 13. As a result, it is possible to realize the tri-partition transfer in which the signal charges accumulated in the photoelectric conversion element 21 are transferred to the floating diffusion capacitor 26, for example, in three batches.

<Tri-Partition Transfer>

Figure 6:
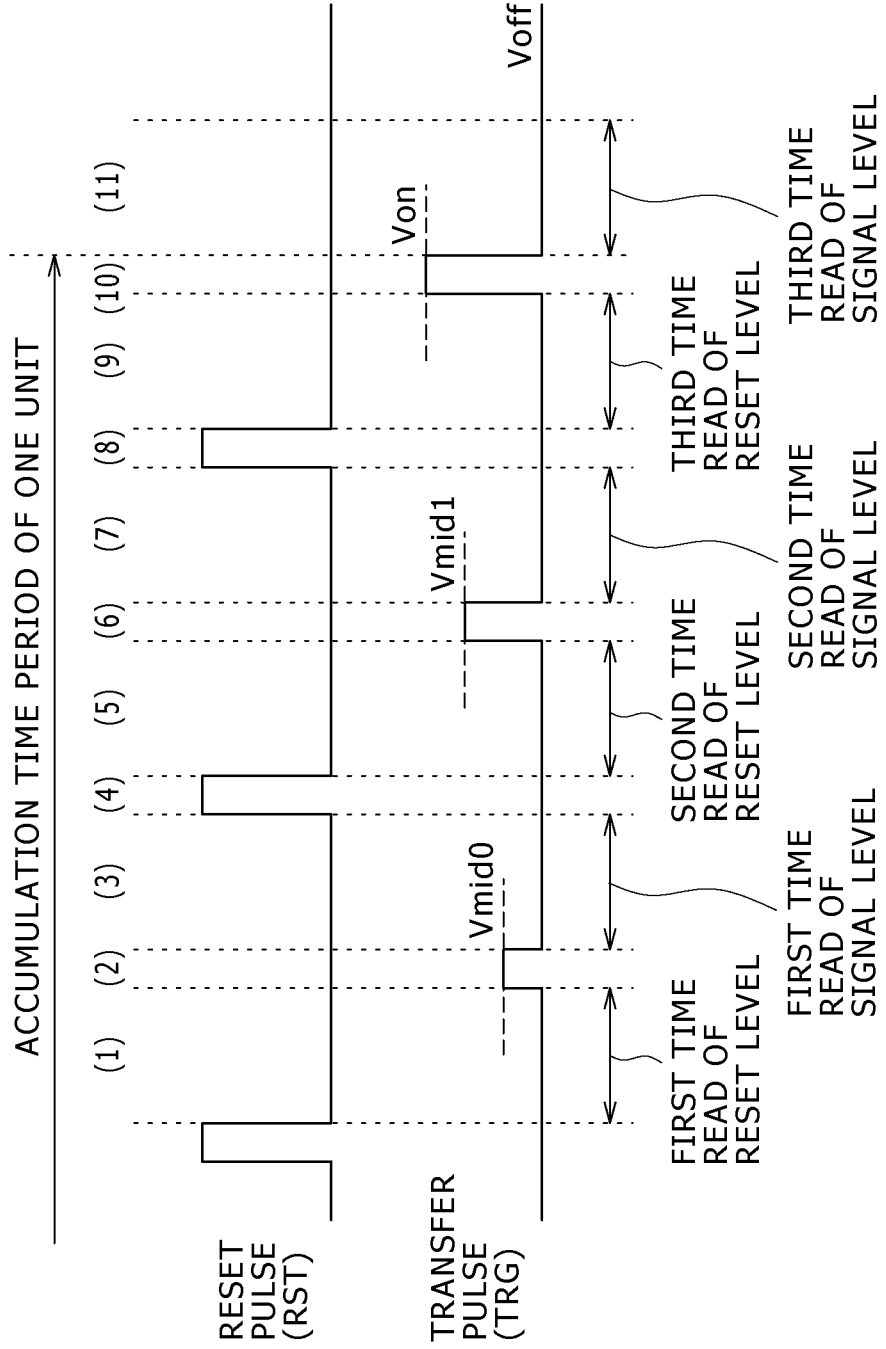
FIG. 6 is a timing chart showing a driving timing example in the case of tri-partition transfer.
Figure 7:
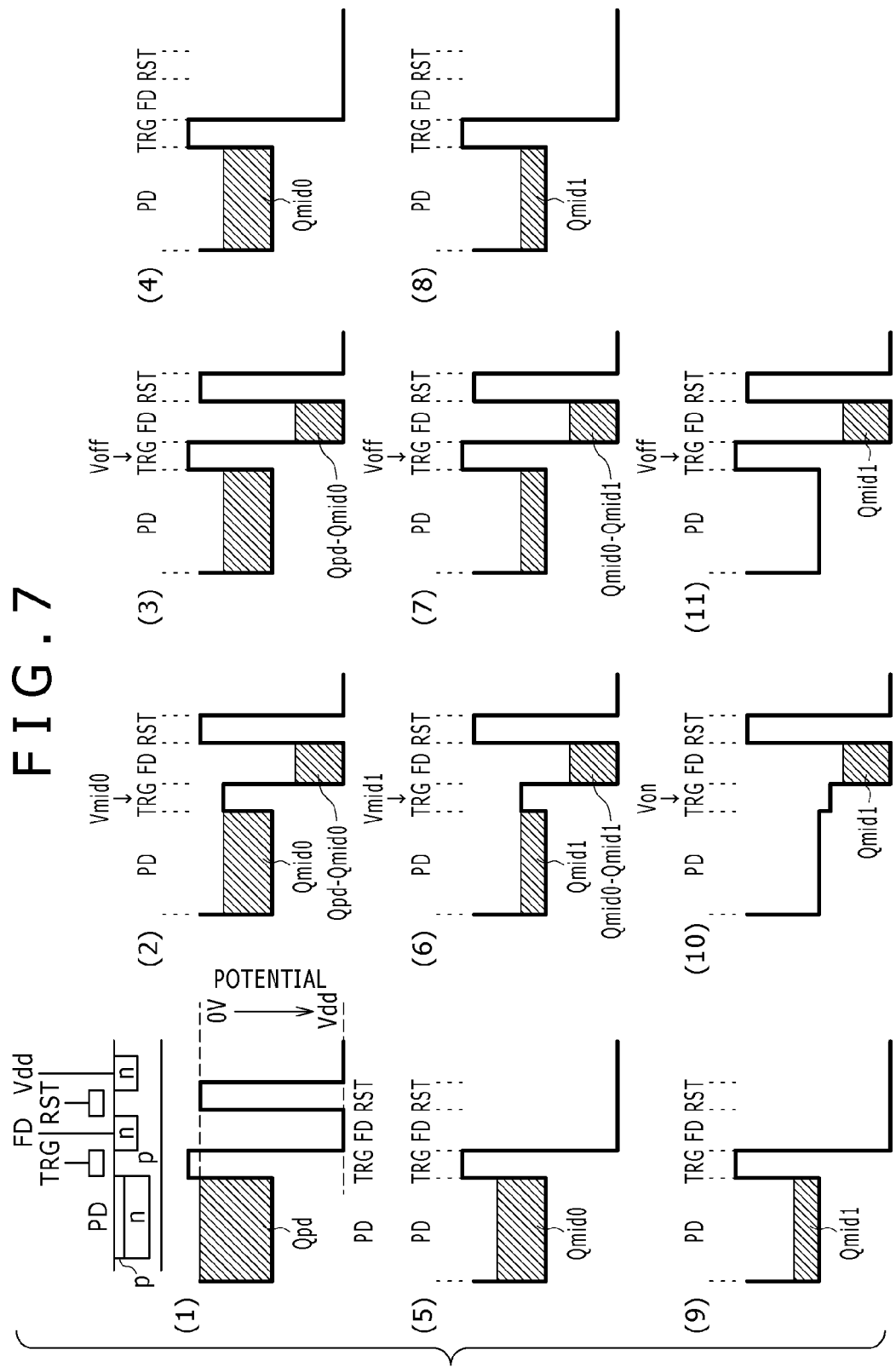
FIG. 7 is an energy diagram explaining an operation in the case of the tri-partition transfer.

Hereinafter, a concrete operation in the case of the tri-partition transfer in a certain pixel row will be described with reference to a timing chart of FIG. 6, and an operation explanatory diagram of FIG. 7. In FIG. 7, operations (1) to (11) correspond to periods, (1) to (11), of time shown in FIG. 6, respectively.

When the signal charges are transferred on the tri-partition transfer basis for an accumulation period of time of one unit in a certain pixel row, the reset pulse PTS is applied three times at given intervals from the vertical scanning circuit 12 to the gate electrode of the reset transistor 23, thereby carrying out the reset operation for the floating diffusion capacitor 26 three times. The intermediate voltages Vmid0 and Vmid1, and the ON voltage Von are successively supplied in this order from the supplied-voltage controlling circuit 13 to the gate electrode of the transfer transistor 22 when a certain period of time elapses every reset operation synchronously with this reset operations.

For the period (1) of time, the charges Qpd are accumulated in the photoelectric conversion element 21. At this time, the OFF voltage Voff is applied to the gate electrode of the transfer transistor 22. In addition, the floating diffusion capacitor 26 has already been reset by the first time reset pulse RST. A reset level of the floating diffusion capacitor 26 is read out in the form of a first time reset level to the vertical signal line 111 through the amplification transistor 24 and the selection transistor 25.

After completion of the first time reading-out of the reset level, the intermediate voltage VminO is applied to the gate electrode of the transfer transistor 22 for the period (2) of time. The application of the intermediate voltage VminO results in that the charges (Qpd−Qmid0) are transferred to the floating diffusion capacitor 26 with partial charges Qmid0 of the accumulated charges Qpd in the photoelectric conversion element 21 being left as they are.

Next, for the period (3) of time, the OFF voltage is applied to the gate electrode of the transfer transistor 22. As a result, a signal corresponding to the charges (Qpd−Qmid0) transferred to the floating diffusion capacitor 26 is read out in the form of a signal having a first signal level to the vertical signal line 111.

Next, for the period (4) of time, the second time reset pulse RST is applied to the gate electrode of the reset transistor 23, thereby resetting the floating diffusion capacitor 26. Next, for the period (5) of time, a signal having the resulting reset level is read out in the form of a signal having a second time reset level to the vertical signal line 111.

Next, for the period (6) of time, the intermediate voltage Vmid1 is applied to the gate electrode of the transfer transistor 22. The application of the intermediate voltage Vmid1 results in that the charges (Qpd−Qmid1) are transferred to the floating diffusion capacitor 26 with the partial charges Qmid1 of the charges Qmid0 remaining in the photoelectric conversion element 21 being left as they are.

Next, for the period (7) of time, the OFF voltage Voff is applied to the gate electrode of the transfer transistor 22. As a result, a signal corresponding to the charges (QpdO−Qmid1) transferred to the floating diffusion capacitor 26 is read out in the form of a signal having a second time signal level to the vertical signal line 111.

Next, for the period (8) of time, a third time reset pulse RST is applied to the gate electrode of the reset transistor 23, thereby resetting the floating diffusion capacitor 26. Next, for the period (9) of time, a signal having the resulting reset level is read out in the form of a signal having a third time reset level to the vertical signal line 111.

Next, for the period (10) of time, the ON voltage Von is applied to the gate electrode of the transfer transistor 22. The application of the ON voltage Von results in that the remaining charges Qmid1 in the photoelectric conversion element 21 are transferred to the floating diffusion capacitor 26.

Next, for the period (11) of time, the OFF voltage Voff is applied to the gate electrode of the transfer transistor 22. As a result, a signal corresponding to the charges Qmid1 transferred to the floating diffusion capacitor 26 is read out in the form of a signal having a third time signal level to the vertical signal line 111.

Figure 8:
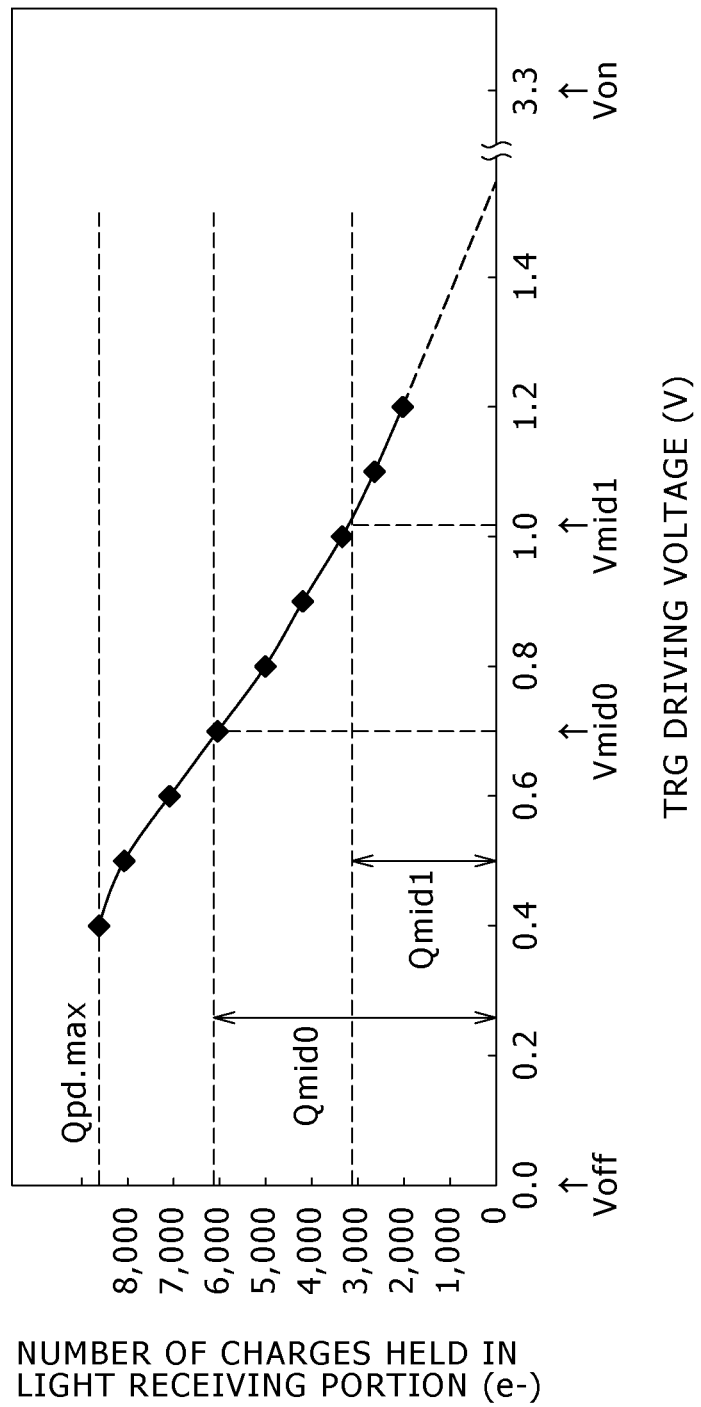
FIG. 8 is a graph showing experimental results as an example of a relationship between a TRG driving voltage and the number of charges held in a photoelectric conversion element.

FIG. 8 shows experimental results as an example of a relationship between a TRG driving voltage (a transfer pulse TRG applied to the gate electrode of the transfer transistor 22), and the number of charges held in the photoelectric conversion element 21.

In this case, there is shown the number of charges held in the photoelectric conversion element 21 when the intermediate voltage Vmid between the ON voltage Von and the OFF voltage Voff in accordance with which the transfer transistor 22 is turned ON and OFF, respectively, is applied to the photoelectric conversion element 21 having the number of electrons saturated of about 5,500 e⁻.

FIG. 8 also shows the number, Qmid0, of charges held, and the number, Qmid1, of charges held when the drive for the tri-partition transfer is carried out with the intermediate voltage Vmid being set as Vmid0 and Vmid1 as an example. Setting the voltage value of the intermediate voltage Vmid and the number of intermediate voltage Vmid1 in such a manner results in that the charges accumulated in the photoelectric conversion element 21 can be transferred in the arbitrary number of charge transferred as a unit, and with the arbitrary number of partitions, and the signals corresponding to the charges thus transferred on the partition basis can be outputted.

In the case of the tri-partition transfer, each of the intermediate voltages Vmid0 and Vmid1 becomes a first control signal, and the ON voltage Von becomes a second control signal.

(Bi-Partition Transfer)

Figure 9:
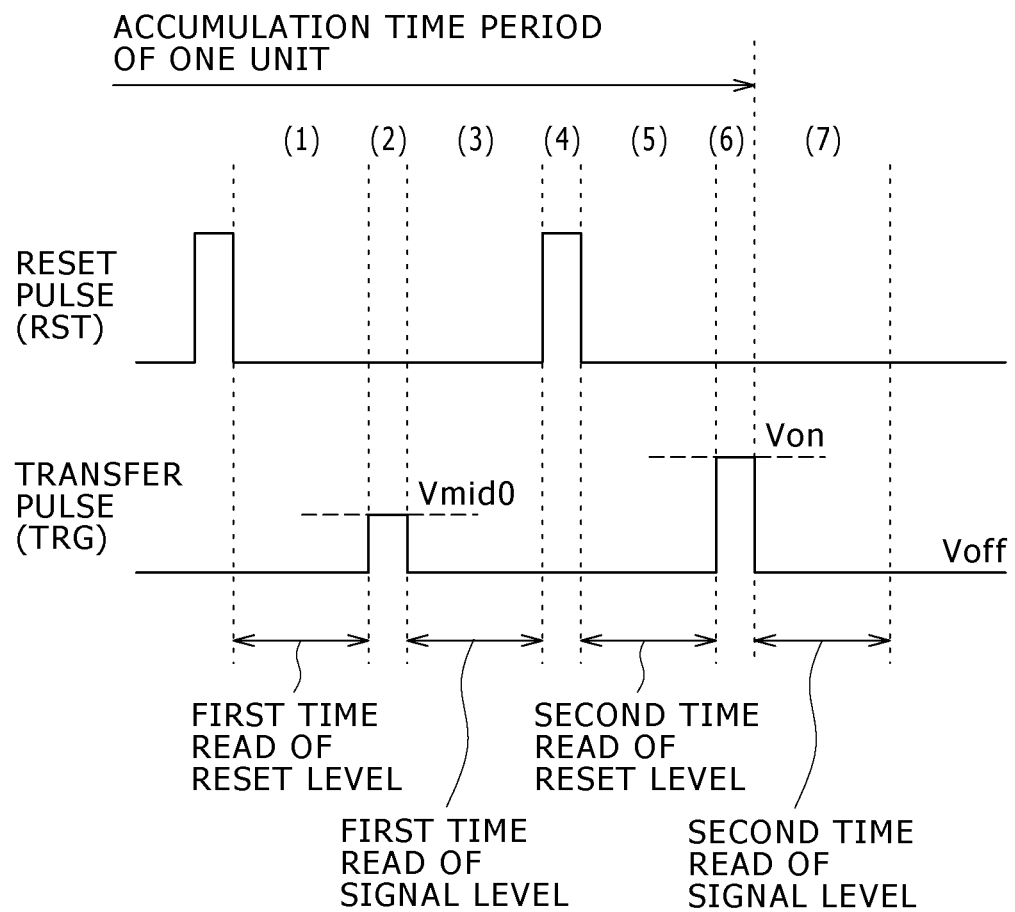
FIG. 9 is a timing chart showing an example of a driving timing in the case of bi-partition transfer.
Figure 10:
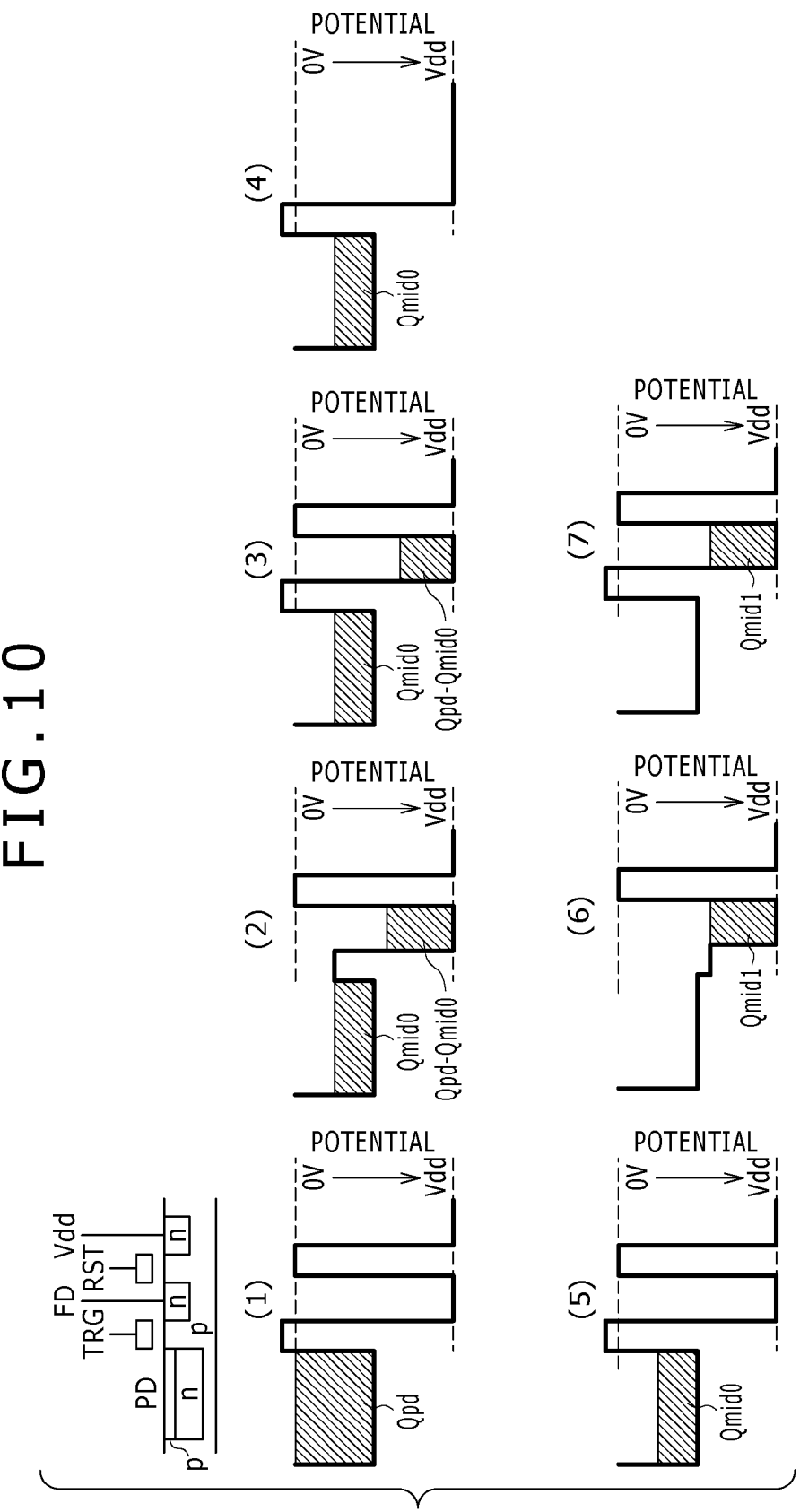
FIG. 10 is a diagram explaining operations in the case of the bi-partition transfer.

FIG. 9 shows an example of a driving timing in the case of a bi-partition transferring operation in a certain pixel row, and FIG. 10 shows a diagram explaining operations in the case of the bi-partition transfer. In FIG. 10, operations (1) to (7) correspond to periods, (1) to (7), of time shown in FIG. 9. The number of transferring operations in the case of the bi-partition transfer is merely one smaller than that in the case of the tri-partition transfer. Thus, the basic operation in the case of the bi-partition transfer is identical to that in the case of the tri-partition transfer.

In the case of the bi-partition transfer, the intermediate voltage Vmid0 becomes the first control voltage, and the ON voltage Von becomes the second control voltage.

<n-Partition Transfer>

Figure 11:
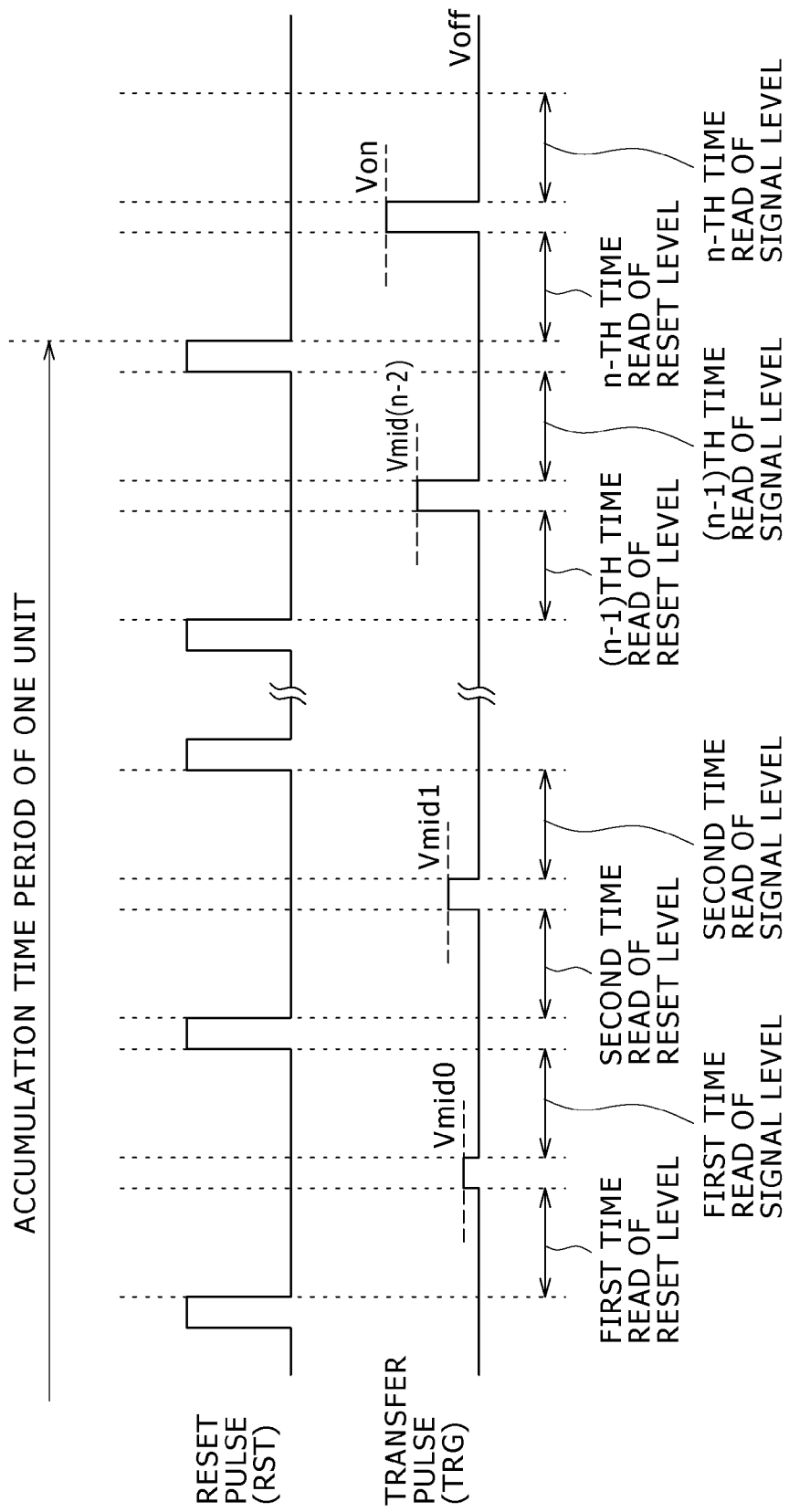
FIG. 11 is a timing chart showing a driving timing example in the case of n-partition transfer.

As it became clear from above, the number of partitions for the transfer operation can be arbitrarily set. Also, when n-partition transfer (n: integral number of 2 or more) is carried out, as shown in FIG. 11, the (n−1) intermediate voltages Vmid0, Vmid1, . . . , Vmid(n−2), and the ON voltage Von have to be applied in order from the supplied-voltage controlling circuit 13 to the gate electrode of the transfer transistor 22, thereby driving the transfer transistor 22 concerned.

In the case of the n-partition transfer, each of the (n−1) intermediate voltages Vmid0 to Vmid(n−2) becomes a first control voltage, and the ON voltage Von becomes a second voltage.

The transfer of the charges, the reset, and the pixel selection are carried out every pixel row under the driving based on the n-partition transfer including tri-partition transfer, quadri-partition transfer and the like described above. As a result, the signal having the reset level and the signal having the signal level (that is, the output signals from the unit pixel 20) are read out in column-parallel, that is, in parallel in units of pixel columns from the unit pixel 20 to the vertical signal line 111 to be supplied to the column circuit 16 through the vertical signal line 111 concerned.

In the CMOS image sensor 10 having the configuration described above, the vertical scanning circuit 12 for driving the constituent elements (the transfer transistor 22, the reset transistor 23, and the selection transistor 25) of the unit pixel 20 includes a first driving section, a second driving section, and a third driving section. In this case, the first driving section drives, with a part of the signal charges accumulated in the photoelectric conversion element 21 for the accumulation period of time of one unit being held in the photoelectric conversion element 21, the transfer transistor 22 by using the first control voltage in accordance with which the accumulated charges having a quantity exceeding a quantity of signal charges held are transferred by the transfer transistor 22. The second driving section drives the transfer transistor 22 by using the second control signal in accordance with which all the signal charges held in the photoelectric conversion element 21 are transferred by the transfer transistor 22. Also, the third driving section drives the output section (composed of the reset transistor 23 and the selection transistor 25) in order to read out the signal charges transferred by successively performing the drive by the first driving section, and the drive by the second driving section.

[Column Circuit]

Hereinafter, configuration examples of the column circuit 16 will be described by giving Examples 1 to 3 as concrete examples. Examples 1 to 3 will be now be described by giving the cases of the configurations each corresponding to the tri-partition basis transfer as examples.

(Example 1)

Figure 12:
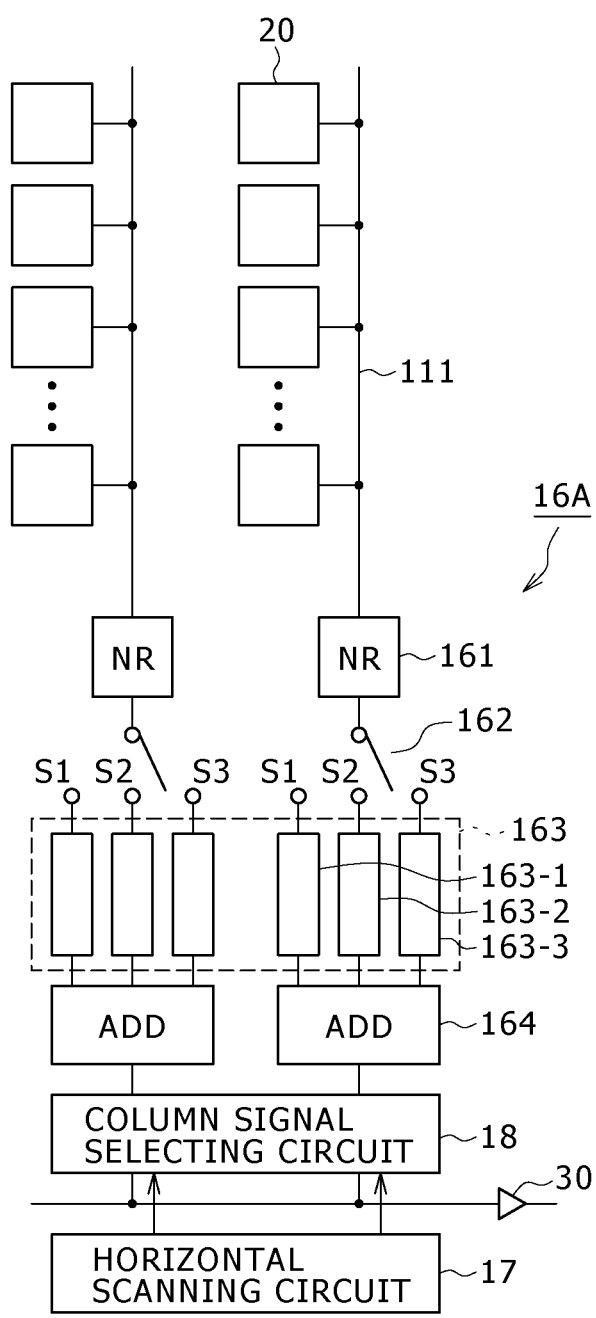
FIG. 12 is a block diagram showing an example of a configuration of a column circuit of Example 1.

FIG. 12 is a block diagram showing an example of a configuration of a column circuit 16A of Example 1. In the figure, units equal to those previously described with reference to FIG. 1 are designated by the same reference numerals, respectively. In this case, the unit pixels 20 and the column circuits 16A for two columns are shown for the sake of simplicity of the drawing.

The column circuit 16A of Example 1 includes a noise removing circuit 161, an output signal selecting circuit 162, an output signal holding circuit 163, and an output signal adding circuit 164.

The noise removing circuit 161 is constituted by a CDS circuit. The noise removing circuit 161 successively obtains differences between first time, second time and third time reset levels and signal levels respective signals of which are successively supplied from the unit pixels 20, thereby removing the reset noises and the fixed pattern noises inherent in each of the pixels owing to a dispersion in threshold of the amplification transistor 24, or the like.

In the above case, the description has been given so far by giving, as an example, the case of the configuration that the noise removing circuit 161 is disposed every pixel column. However, it is also possible to adopt a configuration such that the noise removing circuit 161 is provided as a unit of the output amplifier 30, while the column signal selecting circuit 17 individually selects the reset level and the signal level and supplies the signal having the reset level and the signal having the signal level to the noise removing circuit 161 of the output amplifier 30, and the noise removing circuit 161 executes the CDS processing.

The output signal selecting unit 162 successively selects ones of the output signals which are outputted from the noise removing circuit 161 in order in correspondence to the first time, second time and third time partition transferring operations, and instructs the output holding unit 162 to hold the output signals thus selected in order in its holding units 163-1, 163-2 and 163-3, respectively. The output signal adding unit 164 adds the first time, second time and third time output signals held in the holding units 163-1, 163-2 and 163-3, respectively, to one another.

In this case, the column circuit 16A executes the processing for adding the output signals corresponding to the first time, second time and third time partition transferring operations. However, it is also possible to adopt a configuration such that after the output signals corresponding to the first time, second time and third time partition transferring operations are read out to the outside of the CMOS image sensor 10, an external signal processing system executes the processing for adding these output signals to one another.

Figure 13:
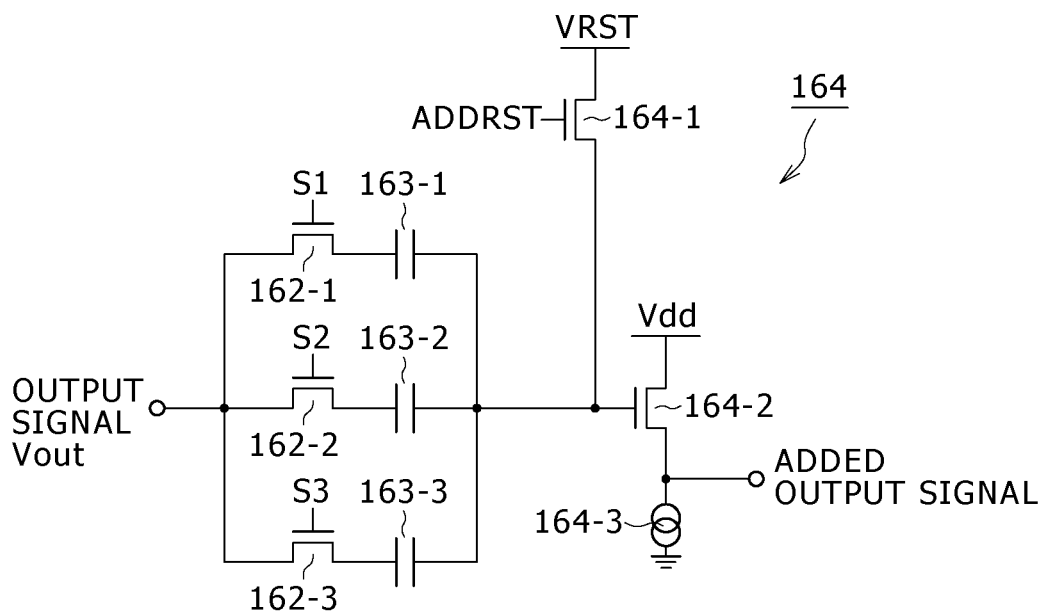
FIG. 13 is a circuit diagram showing a concrete circuit example of an output signal selecting circuit, an output signal holding circuit and an output signal adding circuit.

FIG. 13 is a circuit diagram showing an example of concrete circuits of the output signal selecting circuit 162, the output signal holding circuit 163 and the output signal adding circuit 164.

The output signal selecting circuit 162 is composed of MOS transistors 162-1, 162-2 and 162-3. The MOS transistors 162-1, 162-2 and 162-3 are turned ON in order in response to selection pulses S1, S2 and S3 synchronized with the first time, second time and third time partition transferring operations, respectively, thereby selecting the first time, second time and third time output signals.

The holding units 163-1, 163-2 and 163-3 of the output signal holding circuit 163, for example, include capacitors connected in series with the MOS transistors 162-1, 162-2 and 162-3, respectively. The holding units 163-1, 163-2 and 163-3 hold therein the output signals selected by the MOS transistors 162-1, 162-2 and 162-3, respectively.

The output signal adding circuit 164 is connected between a reset power source VRST and an output node of the output signal holding circuit 163. The output signal adding circuit 164 is composed of a MOS transistor 164-1, a MOS transistor 164-2, and a current source 164-3. Here, the MOS transistor 164-1 is turned ON in response to a reset pulse ADDRST. A gate electrode of the MOS transistor 164-2 is connected to an output node of the output signal holding circuit 163, and a drain electrode thereof is connected to a power source Vdd. Also, the current source 164-3 is connected between a source electrode of the MOS transistor 164-2 and the ground.

Figure 14:
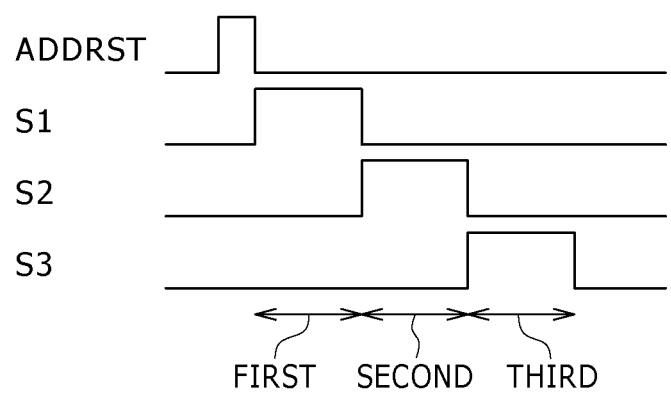
FIG. 14 is a timing chart showing a relationship among a reset pulse ADDRST, and selection pulses S1, S2 and S3.

FIG. 14 shows a timing relationship among the reset pulse ADDRST, and the selection pulses S1, S2 and S3.

In the column circuit 16A having the configuration described above, the MOS transistor 164-1 is turned ON in response to the reset pulse ADDRST, so that the output signal adding circuit 164 becomes an initial state. Next, for the output signals transferred in the first time, second time and third time partition transferring operations, the MOS transistors 162-1, 162-2 and 162-3 are successively turned ON in response to the selection pulses S1, S2 and S3, respectively. As a result, these output signals are held in the holding units 163-1, 163-2 and 163-3, respectively. Also, at a time point when all the output signals transferred on the partition basis transfer are held in the holding units 163-1, 163-2 and 163-3 of the output signal holding circuit 163, respectively, the MOS transistor 164-2 outputs an output signal obtained by adding these output signals to one another from its source electrode.

As has been described so far, the signal charges accumulated in the unit pixel 20 for the accumulation period of time of one unit are transferred in the n-partition basis transferring operations, and the output signals corresponding to the n-partition basis transferring operations, respectively, are added to one another. As a result, since the accumulated charges can be read out at the high conversion efficiency without impairing the saturation level, it is possible to realize the high-sensitivity image sensor. In addition thereto, since the output rate is prevented from increasing in proportion to the number, n, of partitions, it is possible to realize the high frame rate.

Incidentally, a method of increasing the conversion efficiency by, for example, reducing the parasitic capacitance parasitic on the floating difference capacitance (charge-to-voltage conversion unit) 26, a method of increasing the voltage amplification factor of the reading-out circuit, or the like is known as a method of realizing the high-sensitivity image sensor. However, with such a method, the maximum quantity of charges able to be read out through the charge transfer from the photosensitive conversion element 21 is limited to impair the saturation level.

On the other hand, according to Example 1, the number of reading-out operation can be partitioned into the arbitrary number of times of the reading-out operations with an arbitrary quantity of charges as a unit by the transfer drive using the intermediate voltage Vmid. Therefore, all the charges accumulated in the photoelectric conversion element 21 can be read out in plural batches irrespective of the capacitance or initial voltage of the floating difference capacitance (charge-to-voltage conversion unit) 26.

(Example 2)

Figure 15:
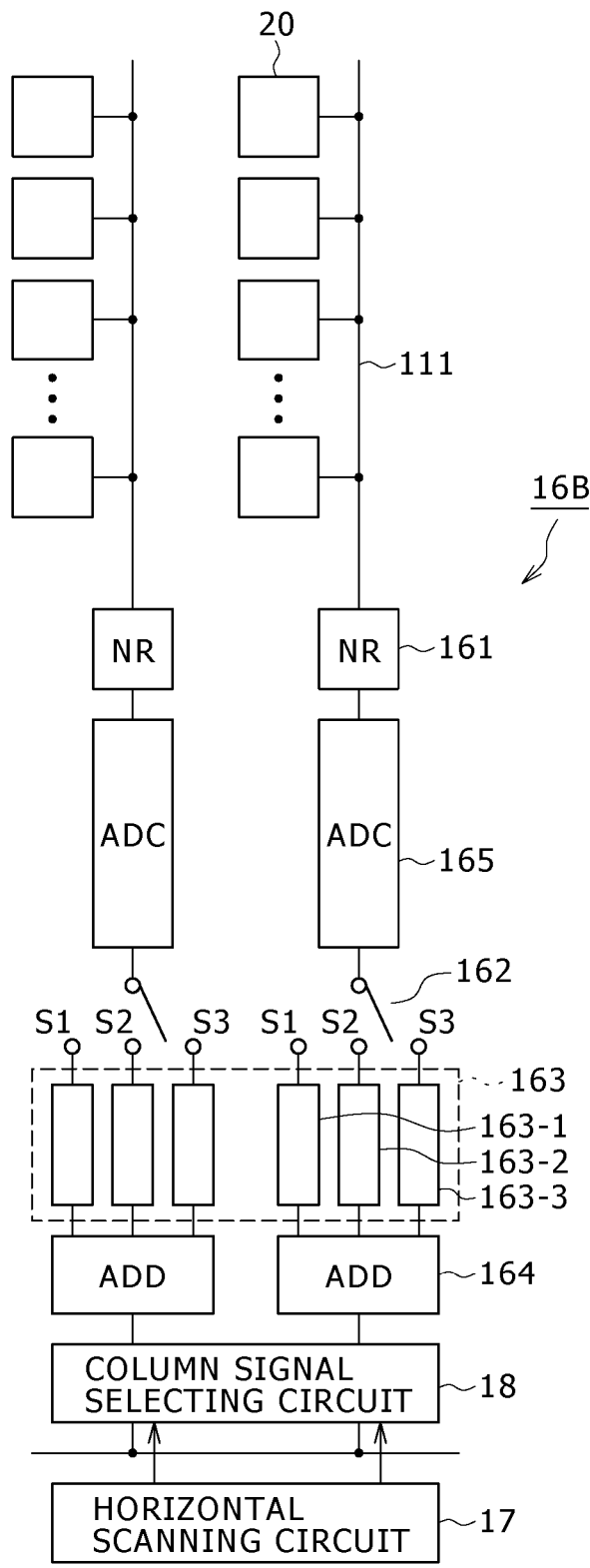
FIG. 15 is a block diagram showing an example of a configuration of a column circuit of Example 2.

FIG. 15 is a block diagram showing an example of a configuration of a column circuit 16B of Example 2. In the figure, units equal to those previously described with reference to FIG. 12 are designated by the same reference numerals, respectively.

The column circuit 16B of Example 2 includes an analog-to-digital conversion (ADC) circuit 165 provided in a subsequent stage of the noise removing circuit 161. The column circuit 16B adopts the following configuration. That is to say, the output signal selecting circuit 162 successively selects the output signals which are outputted in order from the noise removing circuit 161 in correspondence to the first time, second time and third time partition transferring operations, and are then digitized in the ADC circuit 165. The resulting digital output signals are then held in the holding units 163-1, 163-2 and 163-3 of the output signal holding circuit 162, respectively. Also, the addition circuit 164 adds the first time, second time and third time digital output signals to one another.

That is to say, the column circuit 16A of Example 1 executes the addition processing through the analog processing for the output signals transferred in the first time, second time and third time partition basis transferring operations. On the other hand, the column circuit 16B of Example 2 executes the addition processing through the digital processing for the output signals transferred in the first time, second time and third time partition basis transferring operations. Therefore, the column circuit 16B of Example 2 is different from the column circuit 16A of Example 1 only in this respect, and thus is identical in basic circuit operation to the column circuit 16A of Example 1.

(Example 3)

Figure 16:
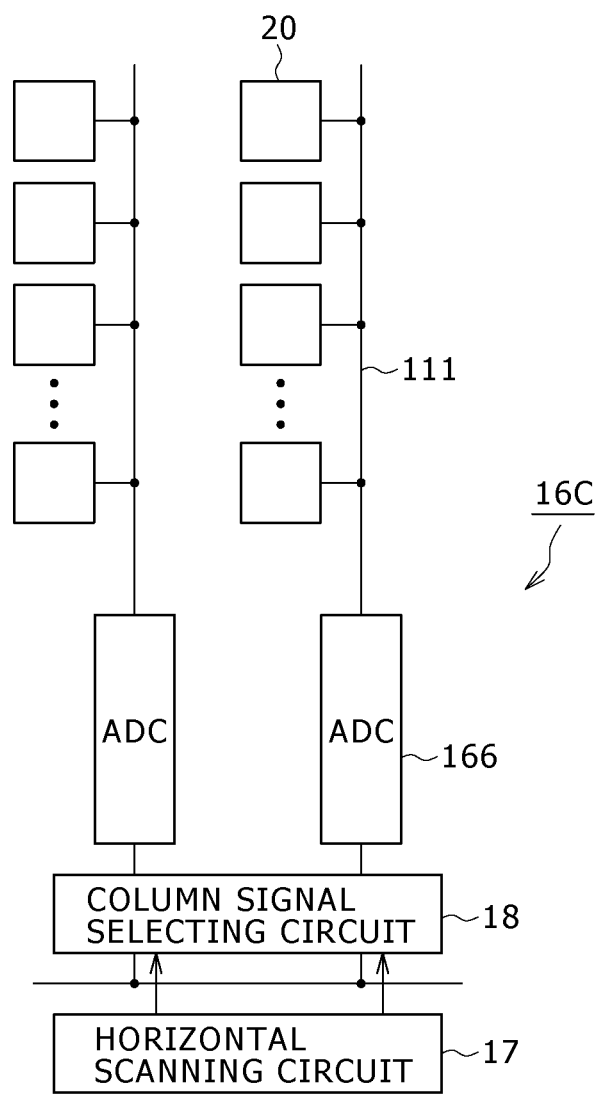
FIG. 16 is a block diagram showing an example of a configuration of a column circuit of Example 3.

FIG. 16 is a block diagram showing an example of a configuration of a column circuit 16C of Example 3. In the figure, units equal to those previously described with reference to FIG. 12 are designated by the same reference numerals, respectively.

The column circuit 16C of Example 3 is constituted by an ADC circuit 166 having an addition function. The ADC circuit 160 has a noise removing (CDS processing) function in addition to the addition function. However, it is not essential that the ADC circuit 166 has the noise removing function. That is to say, as in the case of Example 2, it is also possible to adopt the configuration that the noise removing circuit 161 is disposed on a side of a preceding stage of the ADC circuit 166.

Figure 17:
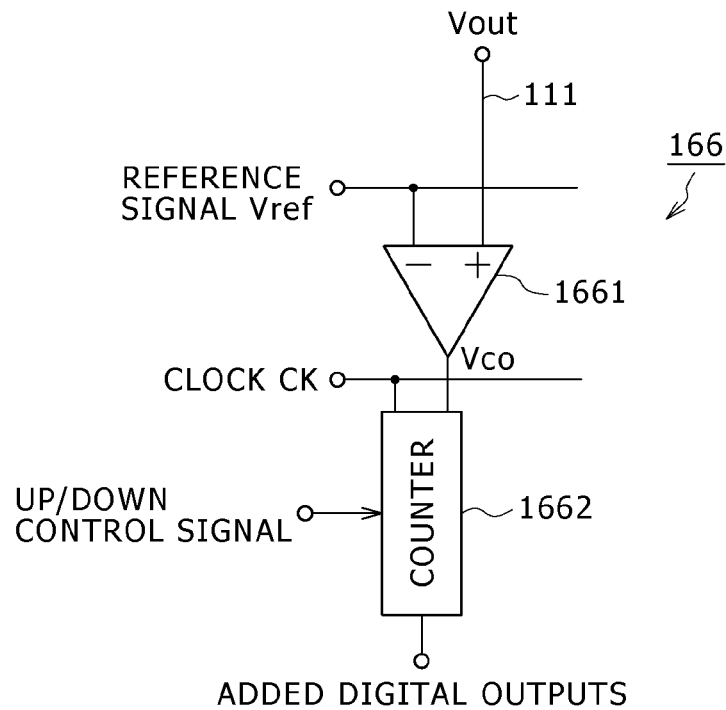
FIG. 17 is a block diagram showing an example of a concrete configuration of an ADC circuit in the column circuit of Example 3.

FIG. 17 is a block diagram showing an example of a concrete configuration of the A/D conversion unit 166. As shown in FIG. 17, the ADC circuit 166 of this example is composed of a voltage comparator 1661 and a counter 1662.

The voltage comparator 1661 receives a reference signal Vref having a ramp waveform at its inverting (−) input terminal, and receives an output signal Vout supplied from the unit pixel 20 through the vertical signal line 111 at its non-inverting (+) terminal. When the output signal Vout is higher in level than the reference signal Vref, the voltage comparator 1661 outputs a comparison result Vco.

The counter 1662 includes an up/down counter. The counter 1662 carries out a count operation for up-count/down-count synchronously with a clock CK under the control based on an up/down control signal for a period of time required for the comparison result Vco in the voltage comparator 1661 to change, thereby incrementing or decrementing a count value.

Figure 18:
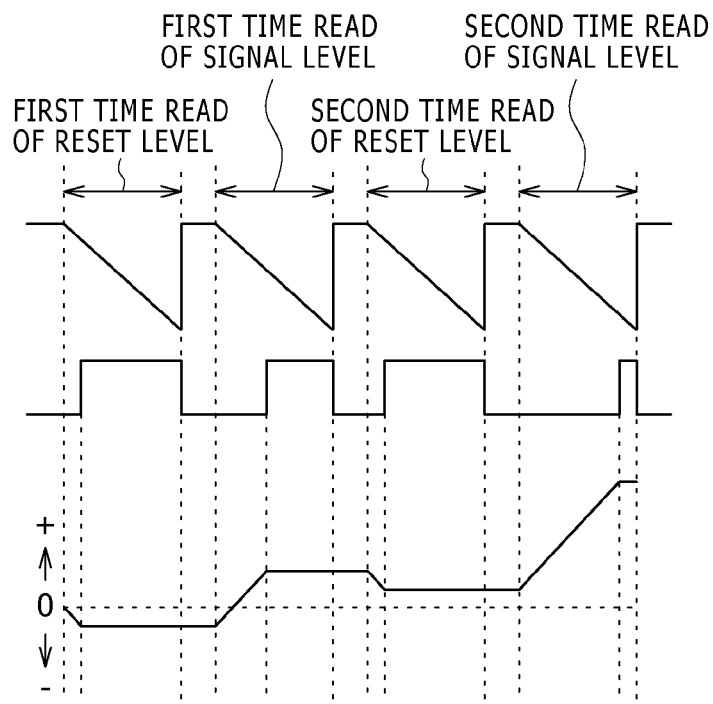
FIG. 18 is a timing waveform chart showing waveforms of a reference signal Vref and a comparison result Vco obtained from a voltage comparator, and a count value of a counter.

FIG. 18 shows waveforms of the reference signal Vref having the ramp waveform, and the comparison result Vco obtained from the voltage comparator 1661, and a count value in the counter 1662.

In this example, for the output signals obtained based on the tri-partition transfer, the count value in the counter 1662 is decremented in the first time reading-out operation for reading out the signal having the reset level, and the count value in the counter 1662 is then incremented in the first time reading-out operation for reading out the signal having the signal level. As a result, a count value corresponding to a difference between the reset level and the signal level is obtained (noise removing processing).

In such a manner, the noise removing processing is executed concurrently with the A/D conversion processing. In addition, the count value in the counter 1662 is decremented in the second time reading-out operation for reading out the signal having the reset level, and the count value in the counter 1662 is incremented in the second time reading-out operation for reading out the signal having the signal level so as to follow the first time A/D conversion processing. As a result, the result after completion of the second time noise removing processing can be added to the result after completion of the first time noise removing processing (addition processing).

That is to say, for the output signals obtained based on the tri-partition transfer, the operation for obtaining the count value corresponding to the difference between the reset level and the signal level is repeatedly carried out, so that the count value in the counter 1662 is repeatedly incremented or decremented. As a result, it is possible to obtain the digital output signal which is obtained by the adding the differences between the reset levels and the signal levels in the reading-out operations based on the respective partition transfers. As apparent from the above, the ADC circuit 166 can be given the functions of the noise removing circuit 161, the output signal holding circuit 163 and the output signal adding circuit 164 of FIG. 12.

The column circuit 16C is constituted by the ADC circuit 166 having the addition function in the manner as described above, which results in that in addition to the operation and effect of Example 1, the holding units 163-1, 163-2 and 163-3 of the signal holding circuit 163 become unnecessary, and it is also unnecessary to increase the number of holding units 163-1, 163-2 and 163-3 in correspondence to the number of partitions for the partition basis transfer. As a result, it is possible to simplify the circuit configuration of the column circuit 16C.

In addition, adoption of the configuration that the ADC circuit 166 has the noise removing function as well makes the noise removing circuit 161 also unnecessary. As a result, it is possible to further simplify the circuit configuration of the column circuit 16C.

<A/D Conversion with Different Conversion Precisions>

Here, the A/D conversion is carried out for the output signals read out from the unit pixel 20 with the same conversion precision in all the reading-out operations based on the n-partition transfer as shown in FIG. 18, each of the execution time for the A/D conversion, and the power consumption increases in proportion to the number, n, of partitions.

On the other hand, the A/D conversion is carried out with the different conversion precisions for the output signals transferred in n-partition basis transferring operations, and the resulting digital output signals are added to one another, which results in that the effects such as the improvement in the execution time (conversion speed) necessary for the A/D conversion, the reduction of the power consumption, and the like can be obtained without impairing the image quality. This respect will be concretely described hereinafter.

Figure 19:
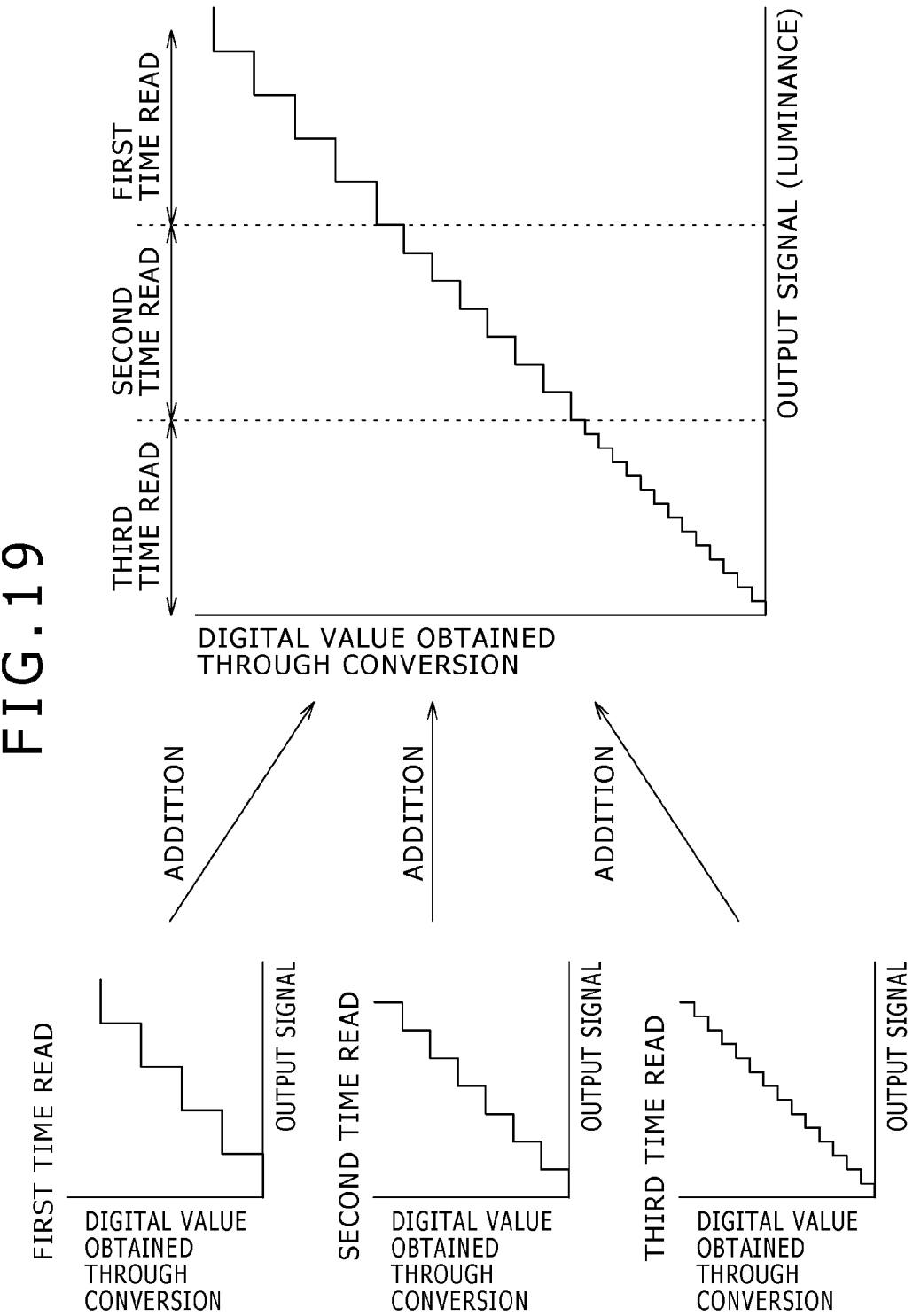
FIG. 19 is a diagram explaining processing when A/D conversion is carried out with different conversion precisions during the tri-partition transfer.

FIG. 19 is a diagram explaining processing when the A/D conversion is carried out with the different conversion precisions during the tri-partition transfer. This processing is an example in which the A/D conversion is carried out with the relatively low conversion precision in the first time reading-out operation, and also the conversion precision is successively increased for the second time and third time reading-out operations. In such a manner, the output signals for n reading-out operations based on the partition transfer are subjected to the A/D conversion with the different conversion precisions to be added to one another, thereby making it possible to obtain the A/D conversion characteristics with which the conversion precision is changed over to another one in correspondence to the luminance of the incident light.

This reason for this is that since the number of charges accumulated in the photoelectric conversion element 21 is less when the luminance of the incident light is low, no output is generated in the first partition basis transfer, and the charges are transferred only in the case of such a luminance as to generate the accumulated charges having the quantity exceeding the threshold depending on the intermediate voltage.

In the case where the charges are transferred on the tri-partition basis as with the example shown in FIG. 8, when the accumulated charges the number of which is smaller than the number, Qmid1, of charges held are generated, that is, when the luminance of the incident light is low, the output signals is obtained only in the third time transferring operation. On the other hand, when there are the accumulated charges the number of which exceeds the number, Qmid0, of charges held, that is, when the luminance of the incident light is high, the output signals are obtained since the charges are transferred from the first time transferring operation on.

As a result, as shown in FIG. 19, it is possible to obtain the characteristics with which when the luminance is low, the high A/D conversion precision is applied, while when the luminance is high, the A/D conversion precisions which are successively mixed with the low A/D conversion precisions are applied.

Figure 20:
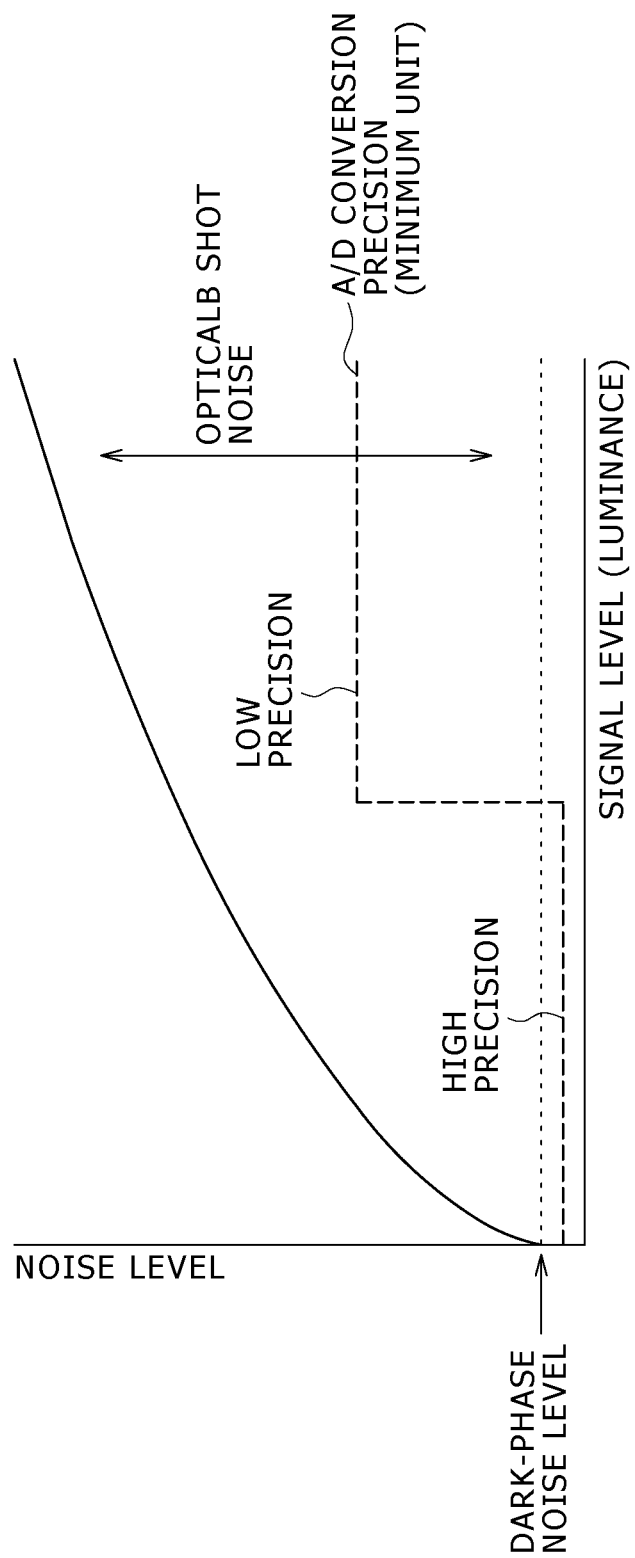
FIG. 20 is a characteristic diagram showing a relationship between a signal level and a noise level each of which is proportional to a luminance of an incident light.

Here, the noise level of the output signal is roughly classified into a dark-phase noise which is generated in the circuit or the like when there is no luminance of the incident light, and an optical shot noise which is generated by the energy obtained in the form of the square root of the luminance of the incident light depending on the luminance of the incident light. For this reason, as shown in FIG. 20, the noise level has the characteristics in which the optical shot noise having the characteristics of the square root of the signal level is added to the dark-phase noise for the signal level proportional to the luminance of the incident light.

Since the A/D conversion precision, that is, a minimum detection unit in the A/D conversion is preferably lower than the noise level, the A/D conversion needs to be carried out with the high precision in the case of the low luminance. However, in the case of the high luminance, the optical shot noise is dominant. Thus, even when the A/D conversion is carried out with the low precision for the output signal to increase the quantization error in the A/D conversion, the image quality is hardly impaired.

<Concrete Example for Setting Different A/D Conversion Precisions>

Subsequently, a description will now be given with respect to a concrete example for setting the different A/D conversion precisions with the configuration of the ADC circuit 166 shown in FIG. 17 with reference to FIG. 21.

The ramp of the reference signal Vref is caused to be N-fold, thereby making it possible to roughen the voltage value per one count, that is, the minimum detection quantity in the A/D conversion. For example, as shown in FIG. 21, in the first time reading-out operation, the ramp of the reference signal Vref is made double that of the reference signal Vref in the second time reading-out operation, thereby applying the A/D conversion having the low conversion precision set therein to the first time reading-out operation.

On the other hand, when the output signals transferred on the tri-partition transfer basis are added to one another, the count value is incremented by N in one clock of the clock CK synchronously with which the counter 1662 is operated, which results in that the output signals transferred on the partition transfer basis can be added to one another with the same weighting factor.

Figure 21:
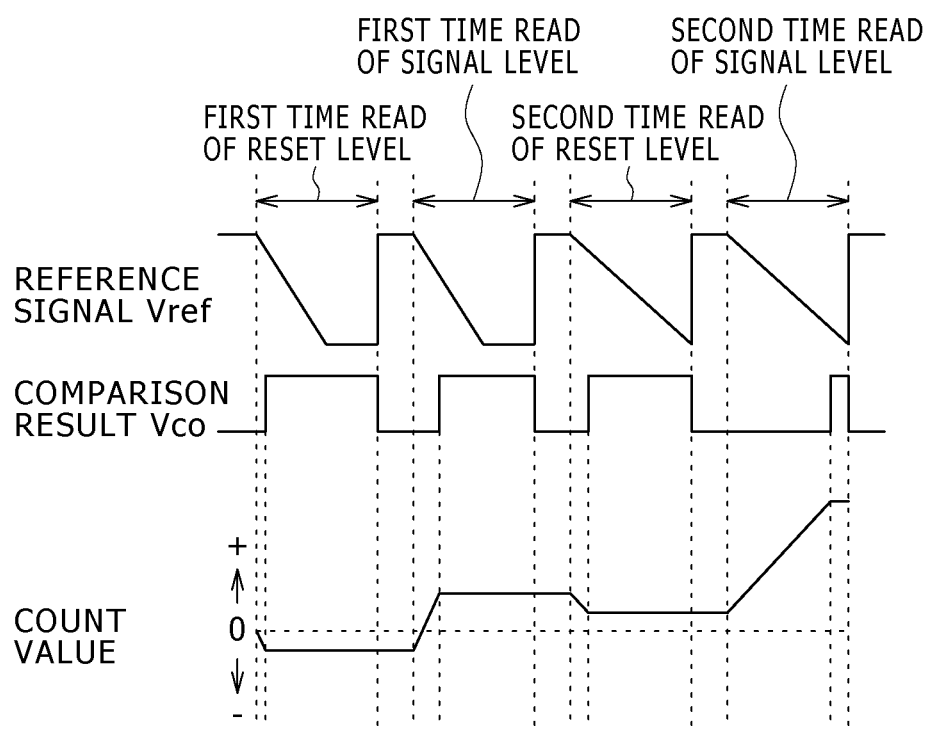
FIG. 21 is an explanatory diagram showing a concrete example in which different A/D conversion precisions are set.

For example, when the ramp of the reference signal Vref is doubled as shown in FIG. 21, the count value is incremented or decremented by 2 per one clock, which results in that the addition with the same weighting factor is carried out while the conversion precision is reduced.

In addition, the ramp of the reference signal Vref is changed without daring to cause the count value to be N-fold, or the count value is caused to be N-fold without changing the ramp of the reference signal Vref, which results in that the output signals transferred on the partition transfer basis can also be added to one another while being multiplied by arbitrary weighting factors, respectively.

Figure 22:
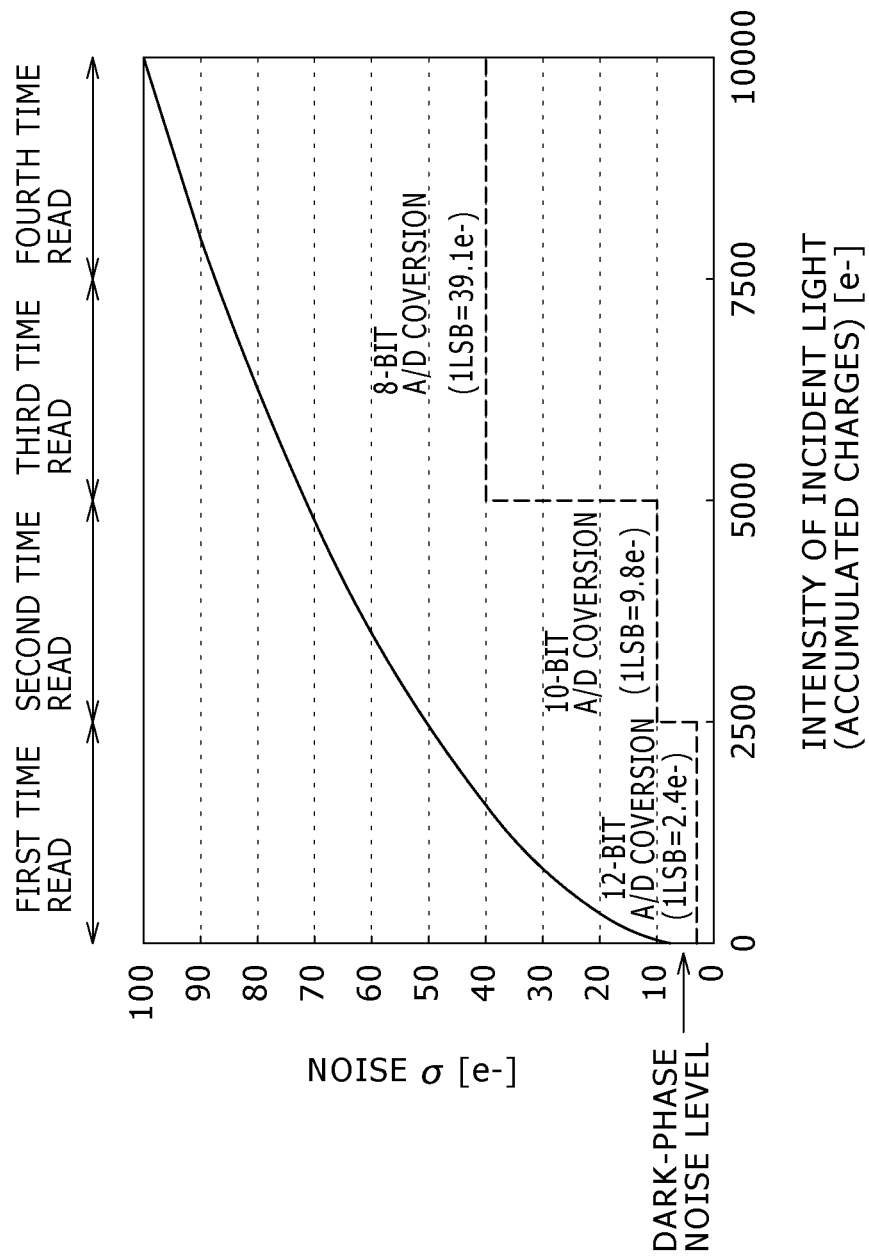
FIG. 22 is a characteristic diagram showing a relationship between an intensity of an incident light (accumulated charges) and a noise level of a signal read out.

FIG. 22 is a characteristic diagram showing a relationship between an intensity of an incident light (accumulated charges) and a noise level of a signal read out when the maximum quantity of charges accumulated in the photoelectric conversion element 21 is set as 10,000 electrons. In this case, the fixed pattern noise in the reading-out operation corresponds to $2e^-$, the random noise in the reading-out operation corresponds to $7e^-$, and the optical shot noise corresponding to the accumulated charges is contained as the noise component.

As shown in FIG. 22, a dark-phase noise level is dominant in a low luminance region having the less accumulated charges. However, when the intensity of the incident light increases and the quantity of charges accumulated increases accordingly, the optical shot noise becomes dominant. For this reason, the application of the A/D conversion having the high conversion precision set therein to the low luminance results in that even in the case of the application of the A/D conversion having the low conversion precision set therein to the high luminance, for example, as shown in FIG. 22, the imager quality is hardly deteriorated because no quantization error in the A/D conversion becomes dominant.

In this example, the conversion precisions per 1LSB in the A/D conversion for 12 bits, 10 bits and 8 bits become $2.4e^-$, $9.8e^-$ and $39.1e^-$, respectively. Thus, when the accumulated charges are transferred on a quadri-partition basis as shown in FIG. 22, the application of the conversion precisions as shown in FIG. 13 to the respective quadri-partitions results in that the quantization error depending on the number of electrons corresponding to 1LSB is largely smaller than the noise component such as the optical shot noise. As a result, this hardly exerts a bad influence on the image quality.

In addition, although in each of the first to third embodiments, the description has been given so far by giving, as an example, the case where the present invention is applied to the CMOS image sensor including the unit pixel 20 having the configuration that the charges in the photoelectric conversion element 21 are transferred to the common floating diffusion capacitor 26 on the partition transfer basis by one transfer transistor 22, and are successively read out to the common vertical signal line 111, the present invention is by no means limited thereto, and various changes can be made.

(Modification 1)

Figure 23:
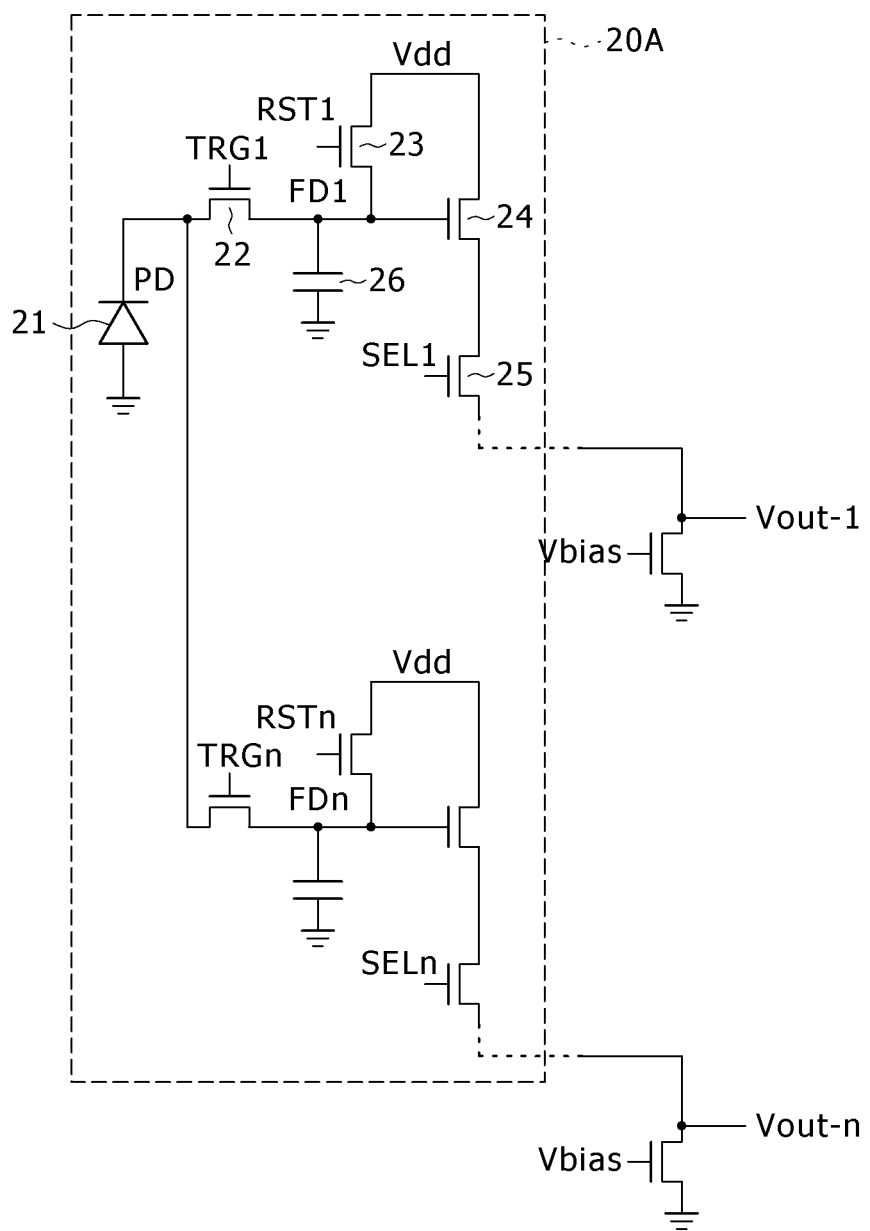
FIG. 23 is a circuit diagram showing a pixel circuit of a unit pixel of Modification 1.

FIG. 23 is a circuit diagram showing a pixel circuit of a unit pixel 20A of Modification 1. In the figure, units equal to those previously described with reference to FIG. 2 are designated by the same reference numerals, respectively.

As shown in FIG. 23, the unit pixel 20A of Modification 1 includes transfer transistors 22-1 to 22-$n$, reset transistors 23-1 to 23-$n$, amplification transistors 24-1 to 24-$n$, selection transistors 25-1 to 25-$n$, and floating diffusion capacitors 26-1 to 26-$n$, so as to correspond to the number, n, of partitions in the partition basis transfer, for the single photoelectric conversion element 21.

In the unit pixel 20A, the charges in the photoelectric conversion element 21 are transferred to the separate floating diffusion capacitors 26-1 to 26-$n$ on the partition transfer basis by the transfer transistors 22-1 to 22-$n$, respectively, to be obtained in the form of output signals Vout-1 to Vout-n of n systems through separate output circuits (composed of the reset transistors 23-1 to 23-$n$, the amplification transistors 24-1 to 24-$n$, and the selection transistors 25-1 to 25-$n$), respectively.

As has been described so far, the embodiment of the present invention can also be applied to the CMOS image sensor including the circuit pixel 20A having the configuration that the charges in the photoelectric conversion element 21 are transferred to the separate floating diffusion capacitors 26-1 to 26-$n$ on the partition transfer basis by the transfer transistors 22-1 to 22-$n$, respectively, to be read out through the separate output circuits, respectively. In addition, the output signals Vout-1 to Vout-n of the n systems read out through the separate output circuits, respectively, are added to one another, thereby making it possible to obtain the same operation and effects as those in the case of the embodiment described above.

(Modification 2)

Figure 24:
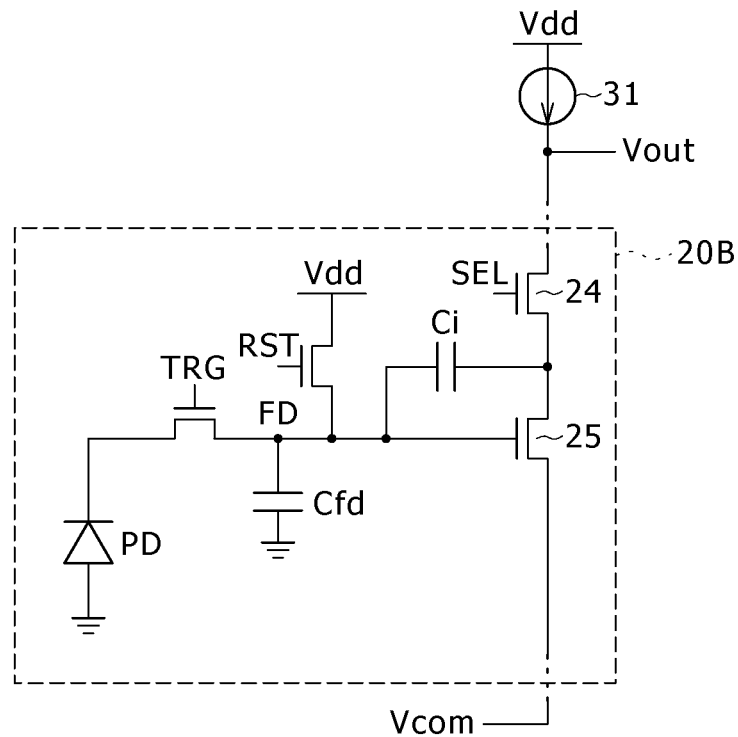
FIG. 24 is a circuit diagram showing a pixel circuit of a unit pixel of Modification 2.

FIG. 24 is a circuit diagram showing a pixel circuit of a unit pixel 20A of Modification 2. In the figure, units equal to those previously described with reference to FIG. 2 are designated by the same reference numerals, respectively.

As shown in FIG. 24, the unit pixel 20B of Modification 2 is configured such that a current source 31 is connected between the drain electrode of the selection transistor 25 connected in series with the amplification transistor 24, and the power source, and the output signal Vout is derived from the drain node of the selection transistor 25.

In the unit pixel 20B, the charge-to-voltage conversion efficiency in the floating diffusion capacitor 26 depends on the capacitance value Ci of the parasitic capacitance between the floating diffusion capacitor 26 and the vertical signal line 111. Thus, the capacitance value Ci of the parasitic capacitance is made smaller than the capacitance value Cfd of the floating diffusion capacitor 26, thereby making it possible to enhance the charge-to-voltage conversion efficiency.

Here, obtaining the effect of the high charge-to-voltage conversion efficiency is conditional on a relationship of Qi.max<Qfd.max where Qfd.max is the maximum quantity of charges accumulated in the floating diffusion capacitor 26, and Qi.max is the maximum quantity of charges accumulated in the parasitic capacitance Ci. For this reason, the charges, having the quantity Qpd, accumulated in the photoelectric conversion element 21 must be transferred on the partition transfer basis with the maximum quantity, Qi.max, of charges accumulated less than the maximum quantity, Qfd.max, of charges accumulated as a unit.

As has been described so far, the CMOS image sensor including the unit pixel 20B having the high charge-to-voltage conversion efficiency or the high voltage amplification factor is advantageous in the S/N ratio, while there may be a limit to the quantity of charges able to be read out in one reading-out operation.

The partition transfer according to the embodiment of the present invention is applied to the CMOS image sensor including the unit pixel 20B, so that the charges in the photoelectric conversion element 21 are transferred on the partition transfer basis, which results in that all the charges generated in the photoelectric conversion element 21 can be efficiently outputted depending on the output range of the reading-out circuit.

In addition, in the unit pixel 20B of Modification 1 shown in FIG. 24, the voltage of the charge-to-voltage conversion unit (the floating diffusion capacitor 26) in the phase of the reset must be set at an operating point of the reading-out circuit. However, application of the partition basis transfer according to the embodiment of the present invention makes it possible to control the quantity of charges transferred on the partition transfer basis without depending on the potential of the charge-to-voltage conversion unit.

(Modification 3)

Figure 25:
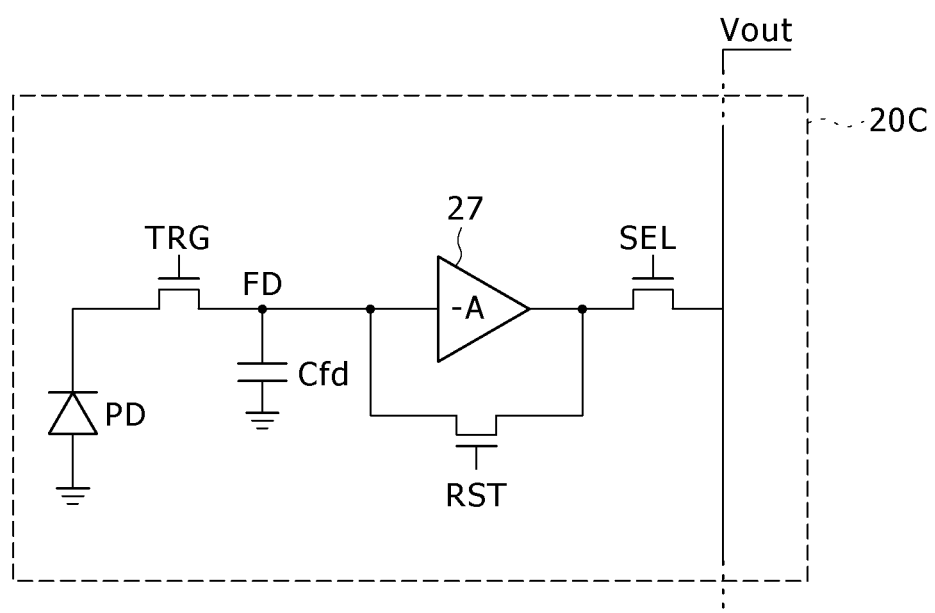
FIG. 25 is a circuit diagram showing a pixel circuit of a unit pixel of Modification 3.

FIG. 25 is a circuit diagram showing a pixel circuit of a unit pixel 20C of Modification 3. In the figure, units equal to those previously described with reference to FIG. 2 are designated by the same reference numerals, respectively.

As shown in FIG. 25, the unit pixel 20C of Modification 2 is configured such that an inverting amplification circuit 27 is connected between the floating diffusion capacitor 26 and the selection transistor 25 instead of using the amplification transistor 24, and the reset transistor 23 is connected in parallel with the inverting amplification circuit 27. Providing the inverting amplification circuit 27 inside the pixel in such a manner results in that the signal level can be amplified to imprive the S/N ratio.

In the CMOS image sensor including the unit pixel 20C having the inverting amplification circuit 27 provided inside the pixel in such a manner, when an amplification factor of the inverting amplification circuit 27 is set as $-A$, an amplitude, $-A \cdot Qfd.max/Cfd$, of the output voltage Vout when the accumulated charges, having the maximum quantity, Qfd.max, are transferred to the floating diffusion capacitor 26 exceed an outputable range $\Delta Vout.pp$ of the output Vout in some cases.

In this case, in order to output all the charges in the form of the output signals, the partition basis transfer must be carried out in units of the quantity of charges in which a quantity, Qmid (<Qfd.max), of charges less than the maximum quantity, Qfd.max, of charges accumulated in the floating diffusion capacitor 26 is set as being maximum.

The partition basis transfer according to the embodiment of the present invention is applied to the CMOS image sensor including the unit pixel 20C, and the charges in the photoelectric conversion element 21 are transferred on the arbitrary partition transfer basis, which results in that all the charges generated in the photoelectric conversion element 21 can be efficiently outputted in correspondence to the outputable range $\Delta Vout.pp$ of the output voltage Vout.

Note that, in each of the first to third embodiments described above, the description has been given so far by giving, as an example, the case where the present invention is applied to the CMOS image sensor in which the unit pixels each serving to detect the signal charges corresponding to a quantity of visible light in the form of a physical quantity are arranged in matrix. However, the present invention is by no means limited to the application to the CMOS image sensor. That is to say, the present invention can also be applied to the general solid-state imaging devices each using the column system in which the column circuit is arranged every pixel column of the pixel array unit.

In addition, the present invention is by no means limited to the application to the imaging device for detecting a distribution of a quantity of incident visible light to capture the distribution thereof in the form of an image. That is to say, the present invention can also be applied to all the solid-state imaging device for detecting a distribution of a quantity of incident infrared rays, X-rays, particles or the like to capture the distribution thereof in the form of an image, and the solid-state imaging device (physical quantity distribution detecting device), such as a fingerprint detecting sensor, for detecting a distribution of other physical quantity such as a pressure or an electrostatic capacitance in a broad sense to capture the distribution thereof in the form of an image.

Moreover, the present invention is by no means limited to the solid-state imaging device for reading out the pixel signals from the respective unit pixels by successively scanning the unit pixels of the pixel array unit in units of rows. That is to say, the present invention can also be applied to an X-Y address type solid-state imaging device for selecting arbitrary pixels in units of pixels, and reading out the signals from the respective pixels thus selected in units of pixels.

It is noted that the solid-state imaging device may have a form of being formed as one chip, or may have a module form, having an imaging function, in which an imaging unit, and a signal processing unit or an optical system are collectively packed.

In addition, the present invention can be applied not only to the solid-state imaging device, but also to an imaging apparatus. Here, the imaging apparatus means a camera system such as a digital still camera or a video camera, or an electronic apparatus, having an imaging function, such as a mobile phone. It is noted that the imaging apparatus also means the above module form mounted to the electronic apparatus, that is, a camera module in some cases.

[Imaging Apparatus]

Figure 26:
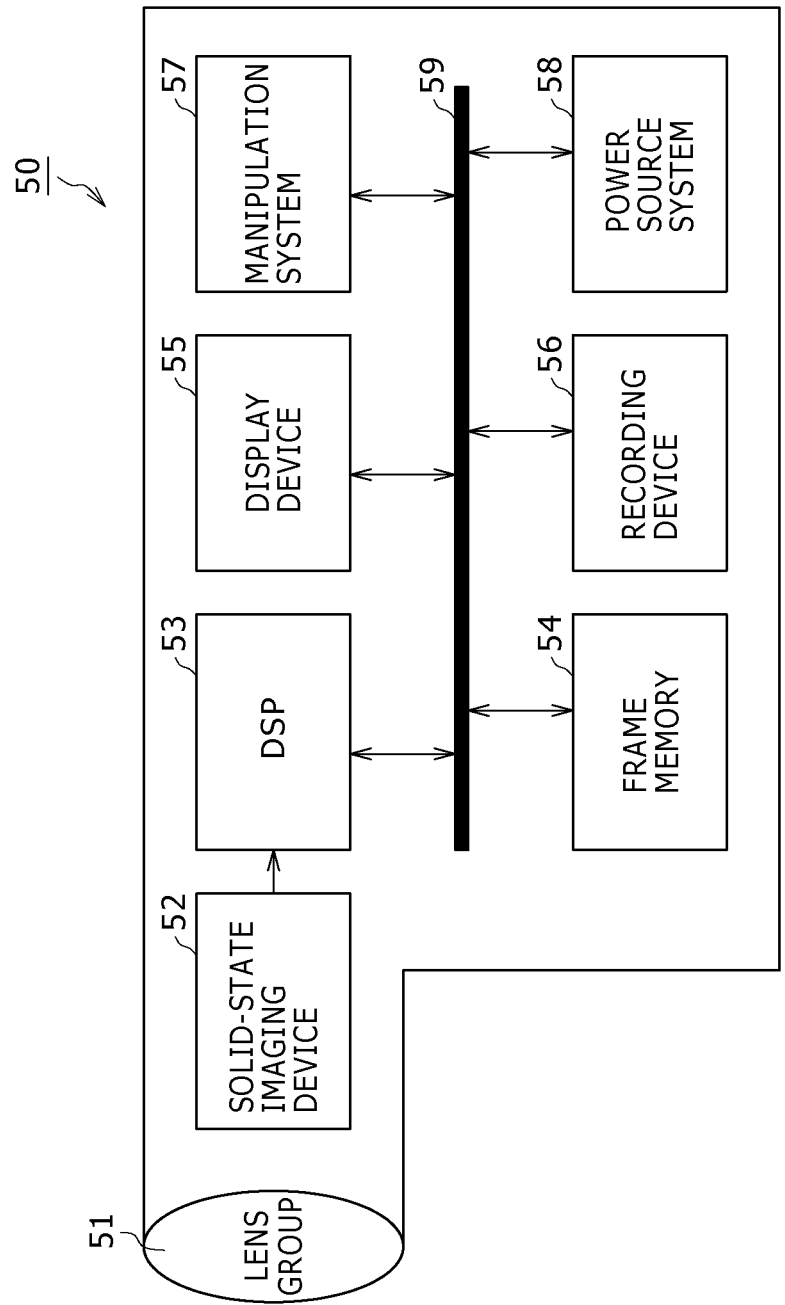
FIG. 26 is a block diagram showing a configuration of an imaging apparatus according to an embodiment of the present invention.
Figure 27:
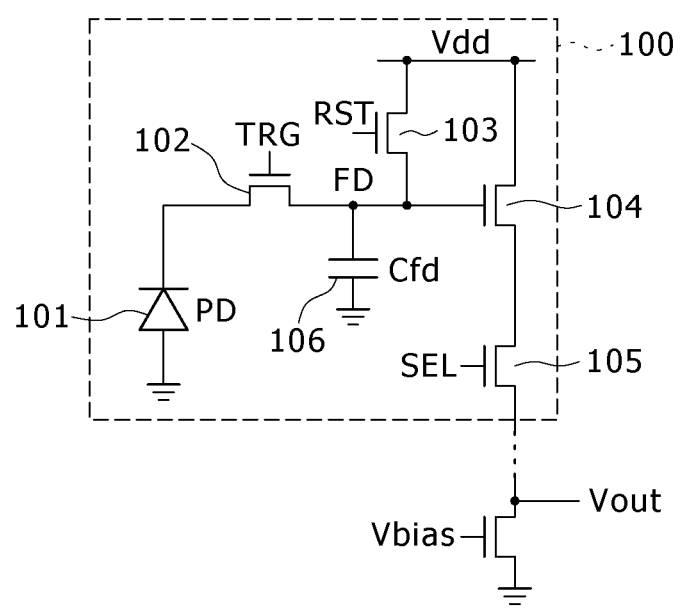
FIG. 27 is a circuit diagram showing an example of a configuration of a unit pixel in the related art.

FIG. 26 is a block diagram showing a configuration of an imaging apparatus according to an embodiment of the present invention. As shown in FIG. 26, the imaging apparatus 50 according to the embodiment of the present invention includes an optical system having a lens group 51, a solid-state imaging device 52, a DSP circuit 53 as a camera signal processing circuit, a frame memory 54, a display device 55, a recording device 56, a manipulation system 57, a power source system 58, and the like. Also, the DSP circuit 53, the frame memory 54, the display device 55, the recording device 56, the manipulation system 57, and the power source system 58 are connected to one another through a bus line 59.

The lens group 51 captures an incident light (image light) from a subject to focus the incident light onto an imaging area of the solid-state imaging device 52. The solid-state imaging device 52 converts a quantity of incident light focused onto the imaging area by the lens group 51 into electrical signals in units of pixels and outputs the electrical signals in the form of pixel signals. The CMOS image sensor 10 of each of the first to third embodiments described above is used as the solid-state imaging device 52.

The display device 55 is constituted by a panel type display device such as a liquid crystal display device or an organic electro luminescence (EL) display device. The display device 55 displays thereon a moving image or a still image captured by the solid-state imaging device 52. The recording device 56 records image data on the moving image or the still image captured by the solid-state imaging device 52 in a recording medium such as a video tape or a digital versatile disk (DVD).

The manipulation system 57 issues manipulation commands about the various functions which the imaging apparatus of this embodiment has under the manipulation made by a user. The power source system 58 suitably supplies the various power sources becoming the operation power sources for the DSP circuit 53, the frame memory 54, the display device 55, the recording device 56, and the manipulation system 57 to those objects of power supply, respectively.

As has been described so far, in the imaging apparatus, such as the camera module, for the video camera or the digital still camera, or the mobile apparatus such as the mobile phone, the CMOS image sensor 10 of the embodiment described above is used as the solid-state imaging device 52 thereof, which results in that with the CMOS image sensor 10, the accumulated charges can be read out at the high conversion efficiency without impairing the saturation level. Consequently, it is possible to realize the high-sensitivity imaging apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device, comprising:
a pixel array section constituted by unit pixels arranged in a matrix, at least one of said unit pixels including a photoelectric conversion unit configured to convert an optical signal into signal charges, a transfer element configured to include a gate electrode and configured to transfer the signal charges obtained through photoelectric conversion of accumulated charges during an exposure period in said photoelectric conversion unit to a floating diffusion element, and a reset element configured to reset the floating diffusion element; and
a vertical scanning circuit including a first driving section and a second driving section,
wherein the first driving section of the vertical scanning circuit is configured to, after resetting the signal charges and after the exposure period, drive said transfer element using at least one of a set of intermediate voltages, the intermediate voltages being different voltage values that are applied to said transfer element; and
the second driving section configured to drive said transfer element using another voltage that is different from said intermediate voltages, after the exposure period,
wherein the at least one of a set of intermediate voltages corresponds to a portion of the accumulated charges, and wherein the another voltage corresponds to a different portion of the accumulated charges.

2. The imaging device according to claim 1, wherein:
the signal charges accumulated in said photoelectric conversion unit are sequentially transferred in two or more batches.

3. The imaging device of claim 1, further comprising:
a third driving section configured to drive an output section in order to read out the signal charges transferred by successively performing the drive by said first driving section and the drive by said second driving section.

4. The imaging device according to claim 3, further comprising:
an addition unit configured to add a plurality of output signals which are successively read out from an output unit by the drive by said third driving section under the drive for said transfer element by said first and second driving sections.

5. The imaging device according to claim 3, further comprising:
an analog-to-digital conversion unit configured to carry out analog-to-digital conversion while adding a plurality of output signals which are successively read out from an output unit by the drive by said third driving section under the drive for said transfer element by said first and second driving sections.

6. The imaging device according to claim 3, further comprising:
an analog-to-digital conversion unit configured to carry out analog-to-digital conversion with different conversion precisions for a plurality of output signals which are successively read out from an output unit by said third driving section under the drive for said transfer element by said first and second driving sections.

7. The imaging device according to claim 6, wherein said analog-to-digital conversion unit increases the conversion precision in correspondence with each reading-out of the plurality of output signals from said output unit.

8. The imaging device according to claim 3, further comprising:
an analog-to-digital conversion unit configured to carry out analog-to-digital conversion with different conversion precisions while adding a plurality of output signals which are successively read out from said output unit by said third driving section under the drive for said transfer element by said first and second driving sections.

9. The imaging device according to claim 1, wherein said pixel array comprises:
a plurality of transfer elements configured to sequentially transfer the signal charges obtained through photoelectric conversion in said photoelectric conversion units in plural batches; and
a plurality of output units configured to output the signal charges transferred thereto by said plurality of transfer elements.

10. The imaging device according to claim 1, wherein said at least one unit pixel further comprises:
a charge-to-voltage conversion unit to which a part of the signal charges obtained through the photoelectric conversion in said photoelectric conversion unit is transferred from said photoelectric conversion unit by said transfer element; and
a unit configured to reset said charge-to-voltage conversion unit at a predetermined potential after the part of the signal charges obtained through the photoelectric conversion in said photoelectric conversion unit is read out from said charge-to-voltage conversion unit by an output unit.

11. The imaging device according to claim 1, further comprising:
a third driving section configured to drive an output section in order to read out the signal charges transferred by successively performing the drive by said first driving section and the drive by said second driving unit section; and
an addition unit configured to add the charges driven by the first driving unit and the charges driven by the second driving unit.

12. The imaging device according to claim 1, wherein a voltage supplying circuit supplies the set of intermediate voltages to a supplied-voltage controlling circuit, the supplied-voltage controlling circuit includes a set of circuit blocks wherein each circuit block receives an address signal from the vertical scanning circuit, and the supplied-voltage controlling circuit applies the intermediate voltages to the gate electrode using the address signal.

* * * * *